(12) United States Patent
Zhang et al.

(10) Patent No.: US 12,277,156 B2
(45) Date of Patent: Apr. 15, 2025

(54) INFORMATION RETRIEVAL METHOD, RELATED SYSTEM, AND STORAGE MEDIUM

(71) Applicant: Huawei Technologies Co., Ltd., Shenzhen (CN)

(72) Inventors: Xinyu Zhang, Hangzhou (CN); Ke Zhan, Shenzhen (CN); Lan Luo, Hangzhou (CN); Chengzhen Fu, Shenzhen (CN); Enrui Hu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/446,034

(22) Filed: Aug. 8, 2023

(65) Prior Publication Data
US 2023/0385317 A1  Nov. 30, 2023

Related U.S. Application Data

(63) Continuation of application No. PCT/CN2022/073819, filed on Jan. 25, 2022.

(30) Foreign Application Priority Data

Feb. 8, 2021 (CN) .......................... 202110172627.5

(51) Int. Cl.
*G06F 17/30* (2006.01)
*G06F 16/334* (2025.01)
(Continued)

(52) U.S. Cl.
CPC .......... *G06F 16/3346* (2019.01); *G06F 16/93* (2019.01); *G06N 3/0455* (2023.01); *G06N 3/08* (2013.01)

(58) Field of Classification Search
CPC ........ G06F 16/13; G06F 16/24; G06F 16/156; G06F 3/1297; G06N 3/00; G06N 5/00;
(Continued)

(56) References Cited

U.S. PATENT DOCUMENTS

2005/0021725 A1\* 1/2005 Lobbert .................. H04L 67/04
709/223
2009/0141631 A1\* 6/2009 Kim ....................... H04L 47/225
370/235
(Continued)

FOREIGN PATENT DOCUMENTS

CN  104573019 B  4/2019

OTHER PUBLICATIONS

Akari Asai et al, "Learning to Retrieve Reasoning Paths Over Wikipedia Graph for Question Answering," Feb. 14, 2020, 22 pages.
(Continued)

*Primary Examiner* — Hung D Le
(74) *Attorney, Agent, or Firm* — Conley Rose, P.C.

(57) ABSTRACT

An information retrieval method includes obtaining Mi $(i+1)^{th}$-hop candidate documents based on a retrieval text query and Ki $i^{th}$-hop candidate documents; obtaining a score of each candidate document in the Mi $(i+1)^{th}$-hop candidate documents; obtaining, based on a score of a candidate document Pjy(i+1) and a probability of a path L, a probability of a path corresponding to the candidate document Pjy(i+1); obtaining K(i+1) $(i+1)^{th}$-hop candidate documents based on probabilities of paths respectively corresponding to the Mi $(i+1)^{th}$-hop candidate documents; and obtaining, based on the K(i+1) $(i+1)^{th}$-hop candidate documents, a retrieval result corresponding to the query.

15 Claims, 10 Drawing Sheets

(51) Int. Cl.
   *G06F 16/93*     (2019.01)
   *G06N 3/0455*    (2023.01)
   *G06N 3/08*      (2023.01)

(58) Field of Classification Search
   CPC ....... G05B 13/00; H03M 7/30; H04N 9/8042; G06T 9/00
   See application file for complete search history.

(56) References Cited

U.S. PATENT DOCUMENTS

| | | | |
|---|---|---|---|
| 2010/0124221 A1* | 5/2010 | Pei | H04L 45/56 |
| | | | 370/389 |
| 2014/0080492 A1* | 3/2014 | Shoshan | H04W 72/21 |
| | | | 455/449 |
| 2014/0269278 A1* | 9/2014 | Alexander | H04L 12/18 |
| | | | 370/230 |
| 2015/0280969 A1* | 10/2015 | Gates | H04L 41/0631 |
| | | | 714/37 |
| 2018/0205635 A1* | 7/2018 | Kim | G06F 16/182 |
| 2018/0302306 A1* | 10/2018 | Carroll | H04L 41/14 |
| 2019/0205301 A1 | 7/2019 | Ni | |
| 2020/0236607 A1* | 7/2020 | Zhu | H04W 24/08 |
| 2021/0258306 A1* | 8/2021 | Dowd | H04L 63/104 |
| 2021/0406669 A1* | 12/2021 | Yu | G06N 3/044 |
| 2022/0164679 A1* | 5/2022 | Taylor | G06F 16/90332 |

OTHER PUBLICATIONS

Wenhan Xiong et al, "Answering Complex Open-Domain Questions With Multi-Hop Dense Retrieval," Sep. 27, 2020, 16 pages.

* cited by examiner

Algeria at the FIFA world Cup
From Wikipedia, the free encyclopedia
Algeria have appeared in the finals of the FIFA World Cup on four occasions in 1982, 1986, 2010 and 2014.
FIG. 6
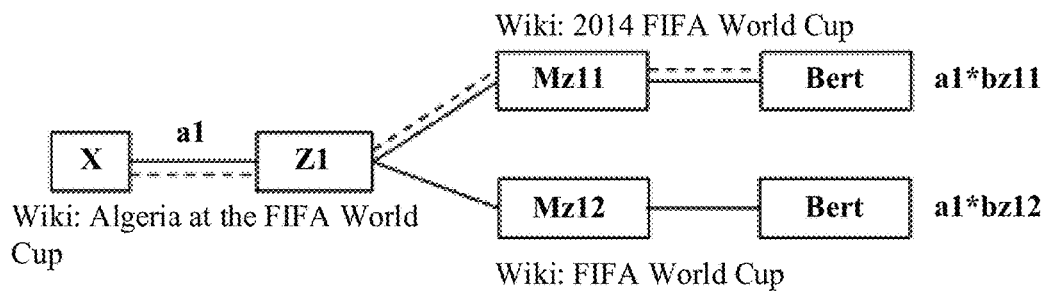
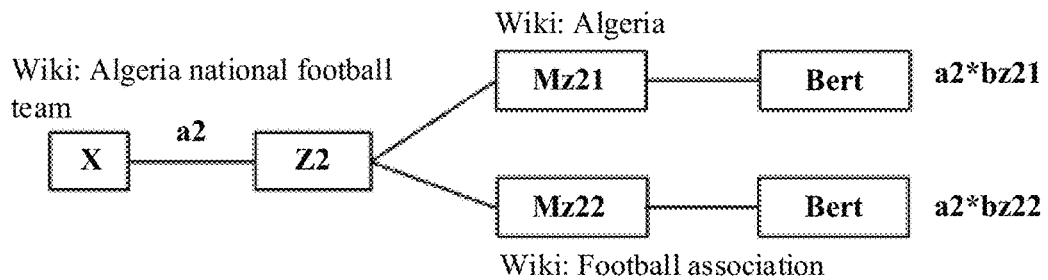
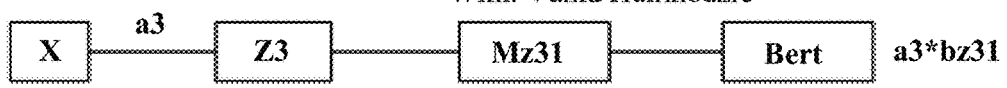
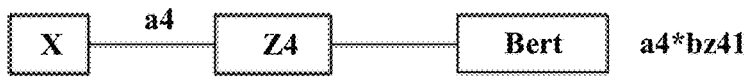
| X | Where did Algeria qualify for the first time into the round of 16? | A | Brazil |
FIG. 7

INFORMATION RETRIEVAL METHOD, RELATED SYSTEM, AND STORAGE MEDIUM

CROSS-REFERENCE TO RELATED APPLICATIONS

This is a continuation of International Patent Application No. PCT/CN2022/073819 filed on Jan. 25, 2022, which claims priority to Chinese Patent Application No. 202110172627.5 filed on Feb. 8, 2021. The disclosures of the aforementioned applications are hereby incorporated by reference in their entireties.

TECHNICAL FIELD

This disclosure relates to the field of artificial intelligence (AI) technologies, and in particular, to an information retrieval method, a related system, and a storage medium.

BACKGROUND

AI is a theory, a method, a technology, or an application system that simulates, extends, and expands human intelligence by using a digital computer or a machine controlled by a digital computer, to perceive an environment, obtain knowledge, and achieve an optimal result based on the knowledge. In other words, AI is a branch of computer science, and is intended to understand essence of intelligence and produce a new intelligence machine that can react in a manner similar to human intelligence. AI is a design principle and an implementation method for studying various intelligence machines, so that the machines have perception, inference, and decision-making functions. Research in the field of AI includes a robot, natural language processing, computer vision, decision-making and inference, human-machine interaction, recommendation and searching, AI basic theories, and the like.

A deep pre-trained language model has become a necessary means for improving tasks such as searching, recommendation, and natural language processing. The model is pre-trained by using massive corpuses, so that the model has an extremely strong text representation capability.

Semantic searching based on the deep pre-trained language model is especially prominent in search business. The semantic searching uses a semantic searching technology to represent a query as a semantic vector, and perform matching based on a similarity relationship between vectors, where the semantic vector may represent implicit and fuzzy semantic information in a text.

There are still some tricky problems for the current deep pre-trained language model. For example, to correctly answer a complex query input by a user, for example, a question that requires a plurality of rounds of inference: "Where did Algeria qualify for the first time into the round of 16?", it is not enough to find only one document through semantic searching. Instead, a document of the "Algeria national football team" needs to be found first, and it is understood that the "Algeria" in the question refers to the "Algeria national football team" and the team "qualified into the round of 16 in the 2014 World Cup". Then, a document of the "2014 World Cup" needs to be found, and it is understood from the document that the 2014 World Cup was held in "Brazil". A correct answer "Brazil" can be found through a series of multi-round retrieval. However, after a search engine improved by the current deep pre-trained language model is used for retrieval, the keyword of the location "Brazil" is not mentioned in the first three documents found through retrieval, and "Brazil" appears for the first time in the $4^{th}$ document. This brings great noise and impact on obtaining the answer, and a retrieval effect is poor.

After searching is improved from single-round searching to multi-round searching, it is more likely to find a supporting document with an answer. Therefore, there are many multi-round retrieval technologies based on the deep pre-trained language model. A conventional technology provides an information retrieval method. As shown in FIG. 1, for a retrieval text query input by a user, multi-round retrieval is performed in a candidate document library, a next round of searching is performed based on a document found in a previous round, and a document set corresponding to the query is finally output.

However, the document set corresponding to the query output in the conventional technology is not a retrieval result that satisfies a requirement of the query, and a retrieval effect is poor.

SUMMARY

This disclosure discloses an information retrieval method, a related system, and a storage medium, to improve accuracy and efficiency of information retrieval.

According to a first aspect, an embodiment of this disclosure provides an information retrieval method, including S1: obtaining Mi $(i+1)^{th}$-hop candidate documents based on a retrieval text query and Ki $i^{th}$-hop candidate documents, where i, Ki, and Mi are all positive integers, and Ki is not greater than Mi, S2: obtaining a score of each candidate document in the Mi $(i+1)^{th}$-hop candidate documents, where the score is for representing a relevance degree between the candidate document and the query, S3: for any candidate document Pjy(i+1) in the Mi $(i+1)^{th}$-hop candidate documents, obtaining, based on a score of the candidate document Pjy(i+1) and a probability of a path L, a probability of a path corresponding to the candidate document Pjy(i+1), where the path L is a path that starts with a first-hop candidate document and ends with a candidate document Pji in the Ki $i^{th}$-hop candidate documents, the candidate document Pji is a $j^{th}$ candidate document in the Ki $i^{th}$-hop candidate documents, the candidate document Pjy(i+1) is a $y^{th}$ candidate document, in the $(i+1)^{th}$-hop candidate documents, obtained based on the $i^{th}$-hop candidate document Pji, and both j and y are positive integers, S4: obtaining K(i+1) $(i+1)^{th}$-hop candidate documents based on probabilities of paths respectively corresponding to the Mi $(i+1)^{th}$-hop candidate documents, where the K(i+1) $(i+1)^{th}$-hop candidate documents are candidate documents in the Mi $(i+1)^{th}$-hop candidate documents, probabilities of paths of the K(i+1) $(i+1)^{th}$-hop candidate documents are all higher than a probability of a path of a remaining candidate document in the Mi candidate documents, and K(i+1) is a positive integer not greater than Mi, and S5: obtaining, based on the K(i+1) $(i+1)^{th}$-hop candidate documents, a retrieval result corresponding to the query.

It should be noted that, steps S1 to S4 merely indicate a part of the information retrieval method, and an execution sequence of S1 to S4 is not limited to the described sequence from S1 to S4. For example, step S3 in which the probability of the path is calculated may be parallel to step S2.

In step S1, obtaining Mi $(i+1)^{th}$-hop candidate documents based on a retrieval text query and Ki $i^{th}$-hop candidate documents may be understood as obtaining the Mi $(i+1)^{th}$-hop candidate documents in total by separately performing processing based on the retrieval text query and each of the Ki $i^{th}$-hop candidate documents.

The probability of the path in step S3 is a probability of selecting the path. The path starts with the first-hop candidate document and ends with any $i^{th}$-hop candidate document. The path indicates that a current-hop candidate document is obtained based on a previous-hop candidate document corresponding to the path. The path may be for explaining the current-hop candidate document, to learn of a process of obtaining the candidate document.

For example, a path that starts with the first-hop candidate document and ends with any fourth-hop candidate document is used as an example for description. The path includes four hops, and correspondingly, the path includes four candidate documents. A second-hop candidate document corresponding to the path may be obtained based on the first-hop candidate document. A third-hop candidate document corresponding to the path may be obtained based on the second-hop candidate document. The fourth-hop candidate document corresponding to the path may be obtained based on the third-hop candidate document. Each path is unique.

In addition, the any candidate document Pjy(i+1) in step S3 indicates that the candidate document is randomly selected. The any candidate document is obtained based on a previous-hop candidate document. j and y are merely used for ease of description, and do not have a specific limitation function.

Ki and K(i+1) may be the same or different. This is not limited in this solution.

In this embodiment of this disclosure, a probability of a path corresponding to each of Mi obtained current-hop candidate documents is obtained based on a score of the candidate document and a probability of a previous-hop path corresponding to the candidate document, so that next-hop candidate documents are obtained based on a plurality of candidate documents with a high probability, and a retrieval result is finally obtained. Compared with a conventional technology in which a plurality of candidate documents obtained in each hop are sorted and screened based on only a score of each candidate document, in this solution, global sorting may be performed on retrieval paths from a globally optimal perspective, to improve accuracy and efficiency of information retrieval.

In an optional implementation, obtaining, based on the K(i+1) $(i+1)^{th}$-hop candidate documents, a retrieval result corresponding to the query includes, when the K(i+1) $(i+1)^{th}$-hop candidate documents satisfy a first preset stop condition, obtaining, based on the K(i+1) $(i+1)^{th}$-hop candidate documents, the retrieval result corresponding to the query.

Obtaining, based on the K(i+1) $(i+1)^{th}$-hop candidate documents, a retrieval result corresponding to the query includes obtaining a path corresponding to each candidate document in the K(i+1) $(i+1)^{th}$-hop candidate documents, where the path corresponding to each candidate document is a path that starts with the first-hop candidate document and ends with the $(i+1)^{th}$-hop candidate document. The path corresponding to each candidate document is used as the retrieval result corresponding to the query. Alternatively, each candidate document is used as the retrieval result corresponding to the query, where the path corresponding to each candidate document is for explaining the retrieval result corresponding to the candidate document.

Compared with the conventional technology in which a document set is finally output, in this solution, an entire path is output, so that a retrieval result is interpretable.

In an optional implementation, if the K(i+1) $(i+1)^{th}$-hop candidate documents do not satisfy the first preset stop condition, i=i+1 is set, and steps S1 to S4 are repeatedly performed until the first preset stop condition is satisfied.

The first preset stop condition is that there is a stop character in at least one candidate document in the K(i+1) $(i+1)^{th}$-hop candidate documents.

According to a second aspect, an embodiment of this disclosure provides an information retrieval method, including obtaining a training sample, where the training sample includes a retrieval text query and a positive sample, the positive sample includes a path corresponding to an $(N+1)^{th}$-hop first document sample, the path corresponding to the $(N+1)^{th}$-hop first document sample is a path that starts with a first-hop document sample and ends with the $(N+1)^{th}$-hop first document sample, the $(N+1)^{th}$-hop first document sample is a document sample corresponding to a path whose probability is higher than probabilities of paths of remaining K(N+1)−1 paths in K(N+1) $(N+1)^{th}$-hop document samples, a probability of a path corresponding to any document sample Pjy(N+1) in the K(N+1) $(N+1)^{th}$-hop document samples is obtained based on a score of the document sample Pjy(N+1) and a probability of a path T, the score is for representing a relevance degree between the document sample and the query, the path T is a path that starts with the first-hop document sample and ends with a document sample PjN in the K(N+1) $(N+1)^{th}$-hop document samples, the document sample PjN is a $j^{th}$ document sample in KN $N^{th}$-hop document samples, the document sample Pjy(N+1) is a $y^{th}$ document sample, in the document samples, obtained based on the document sample PjN, the training sample further includes K1−1 first-hop negative samples, and the K1−1 first-hop negative samples are document samples, in K1 current-hop document samples, other than a current-hop document sample corresponding to the positive sample, where N is a positive integer, both K1 and K(N+1) are integers not less than 2, and both j and y are positive integers, and training a first neural network based on the training sample, to obtain a trained first neural network.

In an optional implementation, training a first neural network based on the training sample, to obtain a trained first neural network includes S1: obtaining Mi $i^{th}$-hop candidate samples based on the query, an $i^{th}$-hop document sample corresponding to the positive sample, Ki−1 $i^{th}$-hop negative samples, and Ki−1 $i^{th}$-hop negative samples of paths, where any one of the $i^{th}$-hop negative samples of the paths includes a path that starts with any one of K1 first-hop document samples and ends with any one of the Ki−1 $i^{th}$-hop negative samples, where i is an integer not less than 1, Ki is an integer not less than 2, and Mi is a positive integer, S2: obtaining a score of each candidate sample in the Mi $i^{th}$-hop candidate samples, S3: obtaining, based on the score of each candidate sample in the Mi $i^{th}$-hop candidate samples, a probability of a path corresponding to each candidate sample, S4: obtaining K(i+1) $(i+1)^{th}$-hop document samples based on probabilities of paths respectively corresponding to the Mi $i^{th}$-hop candidate samples, where probabilities of paths of the K(i+1) $(i+1)^{th}$-hop document samples are all higher than a probability of a path of a remaining candidate sample in the Mi candidate samples, K(i+1) is a positive integer not greater than Mi, and the K(i+1) $(i+1)^{th}$-hop document samples include an $(i+1)^{th}$-hop document sample corresponding to the positive sample and K(i+1)−1 $(i+1)^{th}$-hop negative samples, and S5: adjusting a parameter of the first neural network based on the paths respectively corresponding to the K(i+1) $(i+1)^{th}$-hop document samples and the positive sample, to obtain the trained first neural network, where when i=1, no first-hop negative sample of a path exists.

In this embodiment of this disclosure, during the model training, the first K candidate documents with a high probability of a path are selected, and a next-hop negative sample is determined based on the first K candidate documents. Compared with a conventional technology in which a negative sample in each hop is randomly determined, in this manner, a next-hop negative sample is dynamically determined based on the first K candidate documents with a high probability of a path in each hop. This implements dynamic adaptive candidate selection in each round and enhances robustness. In addition, in the training process of this solution, after a path supervision signal is introduced, K candidate documents selected in each hop may dynamically change with adjustment of a model by the supervision signal. This gradually increases difficulty of a negative sample, enhances a generalization capability of model sorting, and improves model precision.

The adjusting a parameter of the first neural network based on the paths respectively corresponding to the $K(i+1)$ $(i+1)^{th}$-hop document samples and the positive sample includes, when the $K(i+1)$ $(i+1)^{th}$-hop document samples satisfy a second preset stop condition, adjusting the parameter of the first neural network based on the paths respectively corresponding to the $K(i+1)$ $(i+1)^{th}$-hop document samples and the positive sample.

Optionally, if the $K(i+1)$ $(i+1)^{th}$-hop document samples do not satisfy the second preset stop condition, i=i+1 is set, and steps S1 to S4 are repeatedly performed until the second preset stop condition is satisfied.

Optionally, the second preset stop condition is that there is a stop character in at least one candidate sample in the $K(i+1)$ $(i+1)^{th}$-hop document samples.

According to a third aspect, an embodiment of this disclosure provides an information retrieval method, including receiving a query input by a user, and inputting the query into a first neural network, for processing, obtained through training by using the training method, to obtain a retrieval result corresponding to the query.

According to a fourth aspect, an embodiment of this disclosure provides an information retrieval apparatus, including a retrieval model configured to S1: obtain Mi $(i+1)^{th}$-hop candidate documents based on a retrieval text query and Ki $i^{th}$-hop candidate documents, where i, Ki, and Mi are all positive integers, and Ki is not greater than Mi, S2: obtain a score of each candidate document in the Mi $(i+1)^{th}$-hop candidate documents, where the score is for representing a relevance degree between the candidate document and the query, S3: for any candidate document Pjy(i+1) in the Mi $(i+1)^{th}$-hop candidate documents, obtain, based on a score of the candidate document Pjy(i+1) and a probability of a path L, a probability of a path corresponding to the candidate document Pjy(i+1), where the path L is a path that starts with a first-hop candidate document and ends with a candidate document Pji in the Ki $i^{th}$-hop candidate documents, the candidate document Pji is a $j^{th}$ candidate document in the Ki $i^{th}$-hop candidate documents, the candidate document Pjy(i+1) is a $y^{th}$ candidate document, in the $(i+1)^{th}$-hop candidate documents, obtained based on the $i^{th}$-hop candidate document Pji, and both j and y are positive integers, and S4: obtain $K(i+1)$ $(i+1)^{th}$-hop candidate documents based on probabilities of paths respectively corresponding to the Mi $(i+1)^{th}$-hop candidate documents, where the $K(i+1)$ $(i+1)^{th}$-hop candidate documents are candidate documents in the Mi $(i+1)^{th}$-hop candidate documents, probabilities of paths of the $K(i+1)$ $(i+1)^{th}$-hop candidate documents are all higher than a probability of a path of a remaining candidate document in the Mi candidate documents, and $K(i+1)$ is a positive integer not greater than Mi, and a determining model configured to: S5: obtain, based on the $K(i+1)$ $(i+1)^{th}$-hop candidate documents, a retrieval result corresponding to the query.

Optionally, the determining module is configured to, when the $K(i+1)$ $(i+1)^{th}$-hop candidate documents satisfy a first preset stop condition, obtain, based on the $K(i+1)$ $(i+1)^{th}$-hop candidate documents, the retrieval result corresponding to the query.

Optionally, the determining module is further configured to obtain a path corresponding to each candidate document in the $K(i+1)$ $(i+1)^{th}$-hop candidate documents, where the path corresponding to each candidate document is a path that starts with the first-hop candidate document and ends with the $(i+1)^{th}$-hop candidate document. The path corresponding to each candidate document is used as the retrieval result corresponding to the query, or each candidate document is used as the retrieval result corresponding to the query. The path corresponding to each candidate document is for explaining the retrieval result corresponding to the candidate document.

Optionally, the determining module is further configured to, if the $K(i+1)$ $(i+1)^{th}$-hop candidate documents do not satisfy the first preset stop condition, set i=i+1, and repeatedly perform steps S1 to S4 until the first preset stop condition is satisfied.

The first preset stop condition is that there is a stop character in at least one candidate document in the $K(i+1)$ $(i+1)^{th}$-hop candidate documents.

According to a fifth aspect, an embodiment of this disclosure provides a model training apparatus, including an obtaining module configured to obtain a training sample, where the training sample includes a retrieval text query and a positive sample, the positive sample includes a path corresponding to an $(N+1)^{th}$-hop first document sample, the path corresponding to the $(N+1)^{th}$-hop first document sample is a path that starts with a first-hop document sample and ends with the $(N+1)^{th}$-hop first document sample, the $(N+1)^{th}$-hop first document sample is a document sample corresponding to a path whose probability is higher than probabilities of paths of remaining $K(N+1)-1$ paths in $K(N+1)$ $(N+1)^{th}$-hop document samples, a probability of a path corresponding to any document sample Pjy(N+1) in the $K(N+1)$ $(N+1)^{th}$-hop document samples is obtained based on a score of the document sample Pjy(N+1) and a probability of a path T, the score is for representing a relevance degree between the document sample and the query, the path T is a path that starts with the first-hop document sample and ends with a document sample PjN in the $K(N+1)$ $(N+1)^{th}$-hop document samples, the document sample PjN is a $j^{th}$ document sample in KN $N^{th}$-hop document samples, and the document sample Pjy(N+1) is a $y^{th}$ document sample, in the document samples, obtained based on the document sample PjN, the training sample further includes K1−1 first-hop negative samples, and the K1−1 first-hop negative samples are document samples, in K1 current-hop document samples, other than a current-hop document sample corresponding to the positive sample, where N is a positive integer, both K1 and K(N+1) are integers not less than 2, and both j and y are positive integers, and a training module configured to train a first neural network based on the training sample, to obtain a trained first neural network.

In an optional implementation, the training module is configured to: S1: obtain Mi $i^{th}$-hop candidate samples based on the query, an $i^{th}$-hop document sample corresponding to the positive sample, Ki−1 $i^{th}$-hop negative samples, and Ki−1 $i^{th}$-hop negative samples of paths, where any one of the $i^{th}$-hop negative samples of the paths includes a path that starts with any one of K1 first-hop document samples and ends with any one of Ki−1 $i^{th}$-hop negative samples, where i is an integer not less than 1, Ki is an integer not less than 2, and Mi is a positive integer, S2: obtain a score of each candidate sample in the Mi $i^{th}$-hop candidate samples, S3: obtain, based on the score of each candidate sample in the Mi $i^{th}$-hop candidate samples, a probability of a path corresponding to each candidate sample, S4: obtain K(i+1) (i+1)$^{th}$-hop document samples based on probabilities of paths respectively corresponding to the Mi $i^{th}$-hop candidate samples, where probabilities of paths of the K(i+1) (i+1)$^{th}$-hop document samples are all higher than a probability of a path of a remaining candidate sample in the Mi candidate samples, K(i+1) is a positive integer not greater than Mi, and the K(i+1) (i+1)$^{th}$-hop document samples include an (i+1)$^{th}$-hop document sample corresponding to the positive sample and K(i+1)−1 (i+1)$^{th}$-hop negative samples, and S5: adjust a parameter of the first neural network based on the paths respectively corresponding to the K(i+1) (i+1)$^{th}$-hop document samples and the positive sample, to obtain the trained first neural network, where when i=1, no first-hop negative sample of a path exists.

The training module is further configured to, when the K(i+1) (i+1)$^{th}$-hop document samples satisfy a second preset stop condition, adjust the parameter of the first neural network based on the paths respectively corresponding to the K(i+1) (i+1)$^{th}$-hop document samples and the positive sample.

The training module is further configured to, if the K(i+1) (i+1)$^{th}$-hop document samples do not satisfy the second preset stop condition, set i=i+1, and repeatedly perform steps S1 to S4 until the second preset stop condition is satisfied.

The second preset stop condition is that there is a stop character in at least one candidate sample in the K(i+1) (i+1)$^{th}$-hop document samples.

According to a sixth aspect, an embodiment of this disclosure provides an information retrieval system, including a receiving module configured to receive a query input by a user, and a processing module configured to input the query into a first neural network, for processing, obtained through training by using the training method, to obtain a retrieval result corresponding to the query.

According to a seventh aspect, this disclosure provides a computer storage medium, including computer instructions. When the computer instructions are run on an electronic device, the electronic device is enabled to perform the method provided in any one of the possible implementations of the first aspect and/or any one of the possible implementations of the second aspect and/or the method provided in any one of the possible implementations of the third aspect.

According to an eighth aspect, an embodiment of this disclosure provides a computer program product. When the computer program product is run on a computer, the computer is enabled to perform the method provided in any one of the possible implementations of the first aspect and/or any one of the possible implementations of the second aspect and/or the method provided in any one of the possible implementations of the third aspect.

According to a ninth aspect, an embodiment of this disclosure provides an information retrieval apparatus, including a processor and a memory. The memory is configured to store program code, and the processor is configured to invoke the program code, to perform the method provided in any one of the possible implementations of the first aspect and/or any one of the possible implementations of the second aspect and/or the method provided in any one of the possible implementations of the third aspect.

It may be understood that the apparatus according to the fourth aspect, the apparatus according to the fifth aspect, the system according to the sixth aspect, the computer storage medium according to the seventh aspect, the computer program product according to the eighth aspect, or the apparatus according to the ninth aspect is all configured to perform the method provided in any one of the possible implementations of the first aspect, the method provided in any one of the possible implementations of the second aspect, and the method provided in any one of the possible implementations of the third aspect. Therefore, for beneficial effects that can be achieved by the method, refer to beneficial effects in the corresponding method. Details are not described herein again.

BRIEF DESCRIPTION OF DRAWINGS

The following describes the accompanying drawings used in embodiments of this disclosure.

FIG. 6 is a schematic diagram of a web page hyperlink according to an embodiment of this disclosure;

FIG. 7 is a schematic diagram of an information retrieval method according to an embodiment of this disclosure;

DESCRIPTION OF EMBODIMENTS

The following describes embodiments of this disclosure with reference to the accompanying drawings in embodiments of this disclosure. Terms used in implementations in embodiments of this disclosure are merely used to explain specific embodiments of this disclosure, and are not intended to limit this disclosure.

Figure 1:
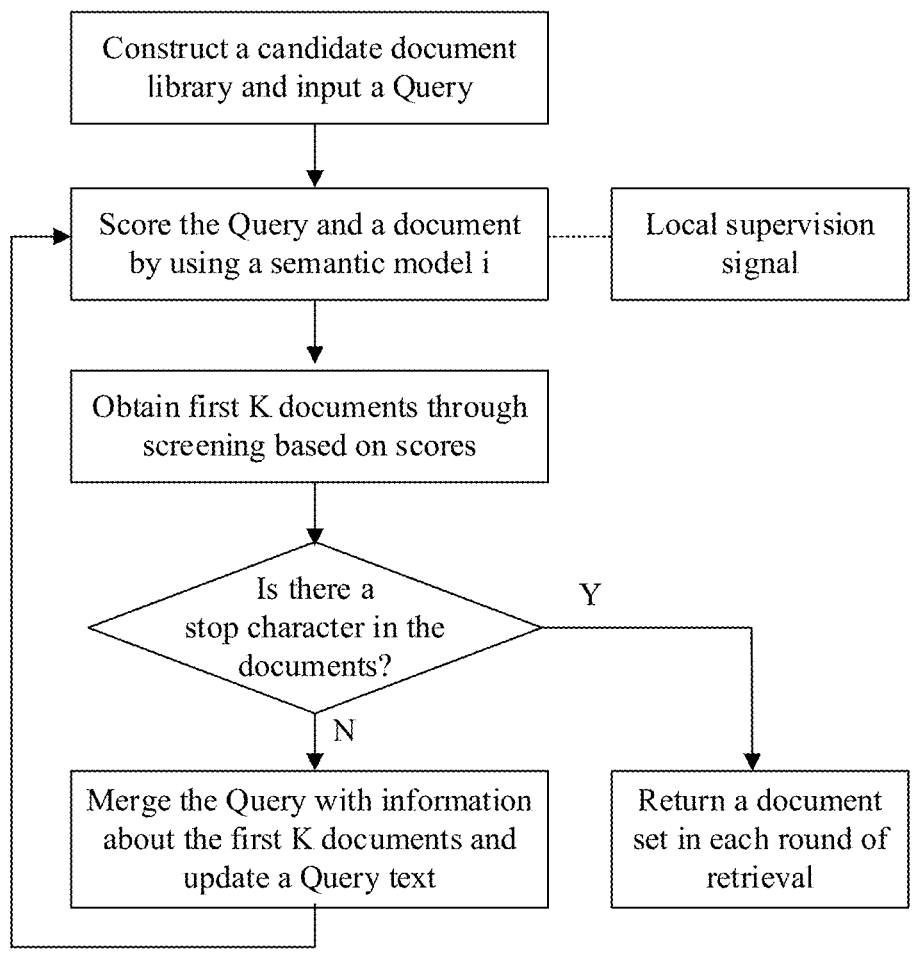
FIG. 1 is a schematic diagram of information retrieval in a conventional technology.
Figure 2A:
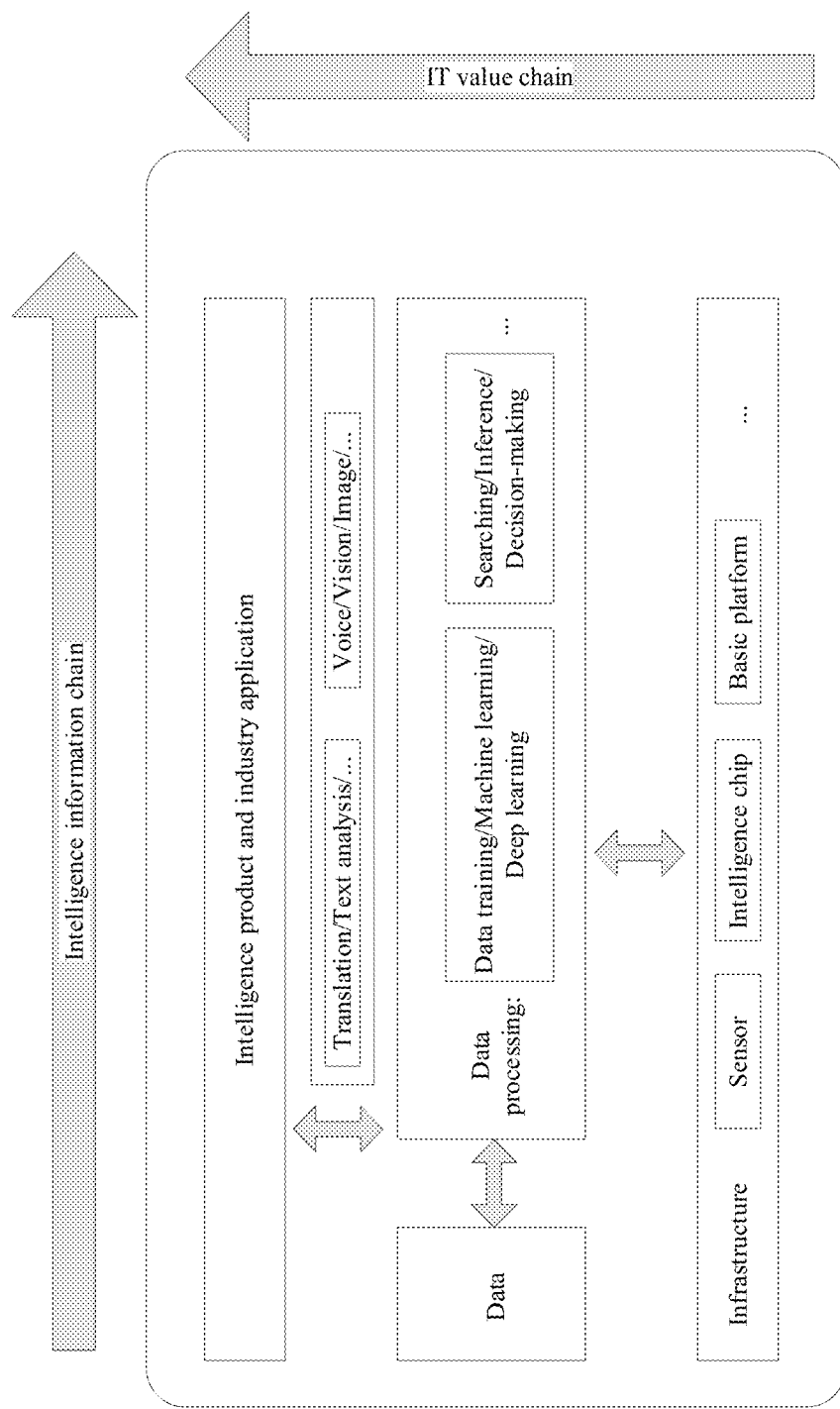
FIG. 2A is a schematic diagram of a main framework of AI according to an embodiment of this disclosure.

FIG. 2A is a schematic diagram of a main framework of AI. The main framework describes an overall working procedure of an AI system, and is applicable to a requirement of a general AI field.

The following describes the main framework of AI from two dimensions: an "intelligence information chain" (a horizontal axis) and an "IT value chain" (a vertical axis).

The "intelligence information chain" reflects a series of processes from obtaining data to processing the data. For example, the process may be a general process including intelligence information perception, intelligence information representation and formation, intelligence inference, intelligence decision-making, and intelligence execution and output. In this process, data undergoes a refinement process of "data-information-knowledge-intelligence".

The "IT value chain" reflects values brought by AI to an information technology industry, from an underlying infrastructure and information (which provides and processes technology implementation) of AI to an industrial ecology process of a system.

(1) Infrastructure:

The infrastructure provides computing capability support for an AI system, implements communication with an external world, and implements support by using a basic platform. The infrastructure communicates with an outside by using a sensor. A computing capability is provided by an intelligence chip (a hardware acceleration chip such as a central processing unit (CPU), a neural network processing unit (NPU), a graphics processing unit (GPU), an application-specific integrated circuit (ASIC), or a field-programmable gate (FPGA)). Basic platforms include related platforms, for example, a distributed computing framework and a network, for assurance and support. The basic platforms may include a cloud storage and computing network, an interconnection network, and the like. For example, the sensor communicates with the outside to obtain data, and the data is provided to the smart chip for computing, where the intelligence chip is in a distributed computing system provided by the basic platform.

(2) Data:

The data at an upper layer of an infrastructure indicates a data source in the field of AI. The data relates to a graph, an image, a voice, and a text, and further relates to internet of things data of a conventional device. The internet of things data of the conventional device includes service data of an existing system, and perception data such as force, displacement, a liquid level, a temperature, and humidity.

(3) Data Processing:

The data processing usually includes a manner such as data training, machine learning, deep learning, searching, inference, or decision-making.

The machine learning and the deep learning may be used to perform symbolic and formal intelligence information modeling, extraction, preprocessing, training, and the like on data.

The inference is, in a computer or an intelligence system, a process in which a human intelligence inference manner is simulated, and machine thinking and problem resolving are performed, based on an inference control policy, with formal information. Typical functions are searching and matching.

The decision-making is a process of making a decision after intelligence information is inferred, and usually provides functions such as classification, ranking, and prediction.

(4) General Capability:

After data processing mentioned above is performed on data, some general capabilities may further be formed based on a result obtained through data processing. For example, the general capabilities may be an algorithm or a general system, for example, translation, text analysis, computer vision processing, voice recognition, and image recognition.

(5) Intelligence Product and Industry Application:

The intelligence product and the industry application are a product and an application of an AI system in various fields, and are package of an overall solution of AI. Decision-making for intelligence information is productized and practical application is implemented. Application fields mainly include smart manufacturing, smart transportation, smart home, smart health care, smart security protection, self-driving, a safe city, a smart terminal, and the like.

Figure 2B:
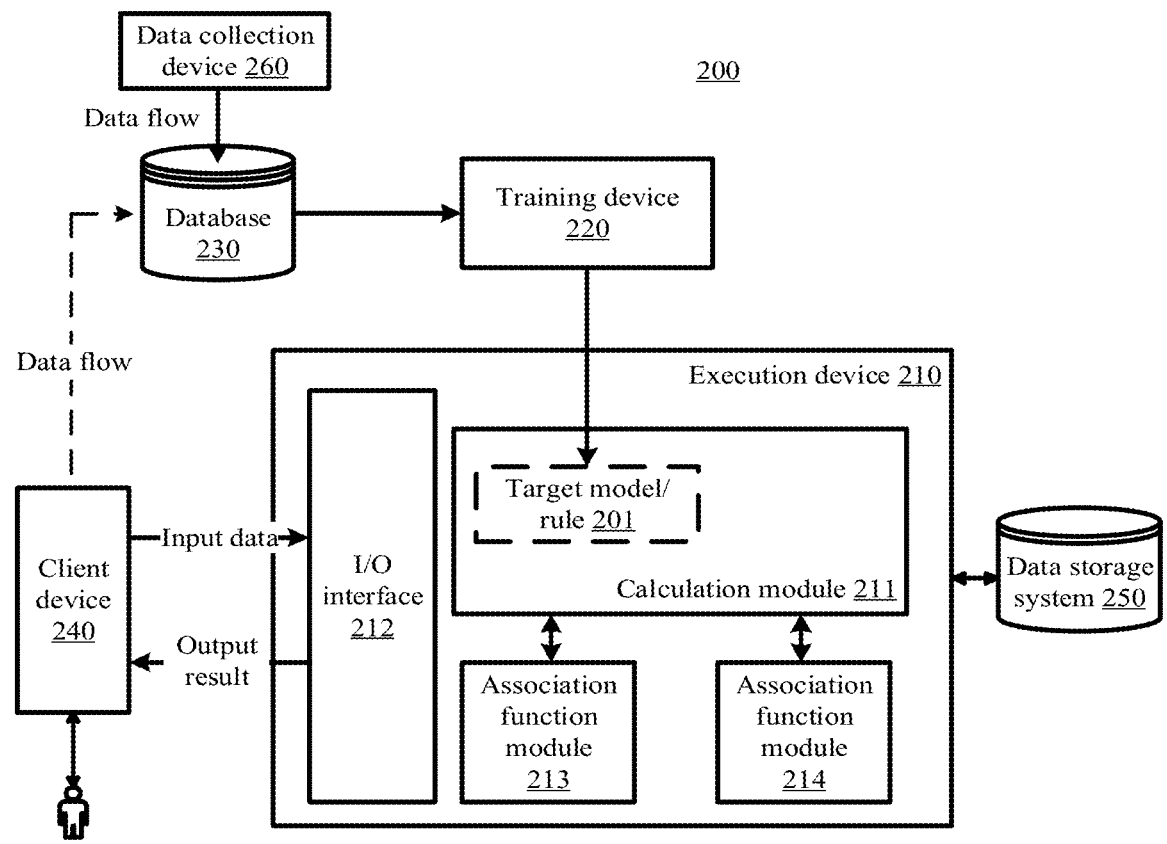
FIG. 2B is a schematic diagram of an application environment according to an embodiment of this disclosure.

Refer to FIG. 2B. An embodiment of the present disclosure provides a system architecture 200. A data collection device 260 is configured to collect web page/text paragraph data and store the data into a database 230. A training device 220 generates a target model/rule 201 based on the web page/text paragraph data maintained in the database 230. The following describes in more detail how the training device 220 obtains the target model/rule 201 based on the web page/text paragraph data. The target model/rule 201 can obtain, based on a retrieval text input by a user, a retrieval result corresponding to the retrieval text.

Work at each layer in a deep neural network may be described by using a mathematical expression $\vec{y}=a(W \times \vec{x}+b)$. The work at each layer in the deep neural network may be understood, from the physical level, as completing transformation from input space to output space (that is, from row space to column space of a matrix) by performing five operations on the input space (a set of input vectors). The five operations include: 1. Dimension increase/dimension reduction; 2. Zoom in/out; 3. Rotation; 4. Translation; and 5. "Bending". The operations 1, 2, and 3 are performed by $W \times \vec{x}$, the operation 4 is performed by +b, and the operation 5 is performed by a ( ). A reason why the word "space" is used herein for description is that a classified object is not a single object, but a type of object. The space is a collection of all individuals of this type of object. W is a weight vector, each value in the vector represents a weight value of a neuron in a neural network at the layer. The vector W determines the space transformation from the input space to the output space described above, that is, a weight W at each layer controls how space is transformed. Training the deep neural network is intended to finally obtain a weight matrix (a weight matrix including vectors W at a plurality of layers) at all layers of a trained neural network. Therefore, a process of training the neural network is essentially a manner of learning control of space transformation, and furthermore, learning the weight matrix.

Because it is expected that an output of the deep neural network is as close as possible to a value that is actually expected to be predicted, a current predicted value of a current network may be compared with a target value that is actually expected, and then a weight vector at each layer of a neural network is updated based on a difference between the current predicted value and the target value (Certainly, there is usually an initialization process before the $1^{st}$ update, to be specific, a parameter is preconfigured for each layer of the deep neural network). For example, if the predicted value of the network is large, the weight vector is adjusted to lower the predicted value, until the neural network can predict the target value that is actually expected. Therefore, "how to compare the difference between the predicted value and the target value" needs to be predefined. This is a loss function or an objective function. The loss function and the objective function are important equations for measuring the difference between the predicted value and the target value. The loss function is used as an example. A higher output value (loss) of the loss function indicates a larger difference. In this case, training of the deep neural network is a process of minimizing the loss.

The target model/rule obtained by the training device 220 may be applied to different systems or devices. In FIG. 2B, an input/output (I/O) interface 212 is configured for an execution device 210, to exchange data with an external device. A user may input data into the I/O interface 212 by using a client device 240.

The execution device 210 may invoke data, code, and the like in a data storage system 250, and may further store data, instructions, and the like, in the data storage system 250.

A calculation module 211 processes the input data by using the target model/rule 201, including: S1: obtaining Mi $(i+1)^{th}$-hop candidate documents based on a retrieval text query input by a user and K $i^{th}$-hop candidate documents, where i, K, and Mi are all positive integers, and K is not greater than Mi, S2: obtaining a score of each candidate document in the Mi $(i+1)^{th}$-hop candidate documents, where the score is for representing a relevance degree between the candidate document and the query, S3: for any candidate document Pjy(i+1) in the Mi $(i+1)^{th}$-hop candidate documents, obtaining, based on a score of the candidate document Pjy(i+1) and a probability of a path L, a probability of a path corresponding to the candidate document Pjy(i+1), where the path L is a path that starts with a first-hop candidate document and ends with a candidate document Pji in the K $i^{th}$-hop candidate documents, the candidate document Pji is a $j^{th}$ candidate document in the K $i^{th}$-hop candidate documents, and the candidate document Pjy(i+1) is a $y^{th}$ candidate document, in the $(i+1)^{th}$-hop candidate documents, obtained based on the $i^{th}$-hop candidate document Pji, S4: obtaining K(i+1)$^{th}$-hop candidate documents based on probabilities of paths respectively corresponding to the Mi $(i+1)^{th}$-hop candidate documents, where the K(i+1)$^{th}$-hop candidate documents are K documents with a high probability of a path in the Mi candidate documents, and obtaining, based on the K $i^{th}$-hop candidate documents and the K(i+1)$^{th}$-hop candidate documents, a retrieval result corresponding to the query.

An association function module 213 may perform corresponding processing on the retrieval result corresponding to the query, to obtain a processed result. For example, a path with the highest probability may be used as the processing result.

An association function module 214 may further extract a target answer based on the path with the highest probability.

Finally, the I/O interface 212 returns the processing result to the client device 240, and provides the processing result to the user.

More deeply, the training device 220 may generate, for different targets, based on different data, corresponding target models/rules 201, to provide a better result for the user.

In a case shown in FIG. 2B, the user may manually specify data to be input into the execution device 210, for example, may perform an operation on an interface provided by the I/O interface 212. In another case, the client device 240 may automatically input the data into the I/O interface 212 and obtain the result. If the client device 240 needs to obtain permission of the user for automatically inputting the data, the user may set corresponding permission in the client device 240. The user can view, in the client device 240, the result output by the execution device 210. The result may be further presented in a specific manner, for example, display, sound, or an action. The client device 240 may alternatively serve as a data collection end, to store collected web page/text paraphrase data in the database 230.

It should be noted that, FIG. 2B is merely a schematic diagram of an architecture of a system according to an embodiment of the present disclosure. A position relationship between devices, components, modules, and the like shown in the figure does not constitute any limitation. For example, in FIG. 2B, the data storage system 250 is an external storage device for the execution device 210, and in another case, the data storage system 250 may alternatively be disposed in the execution device 210.

Figure 2C:
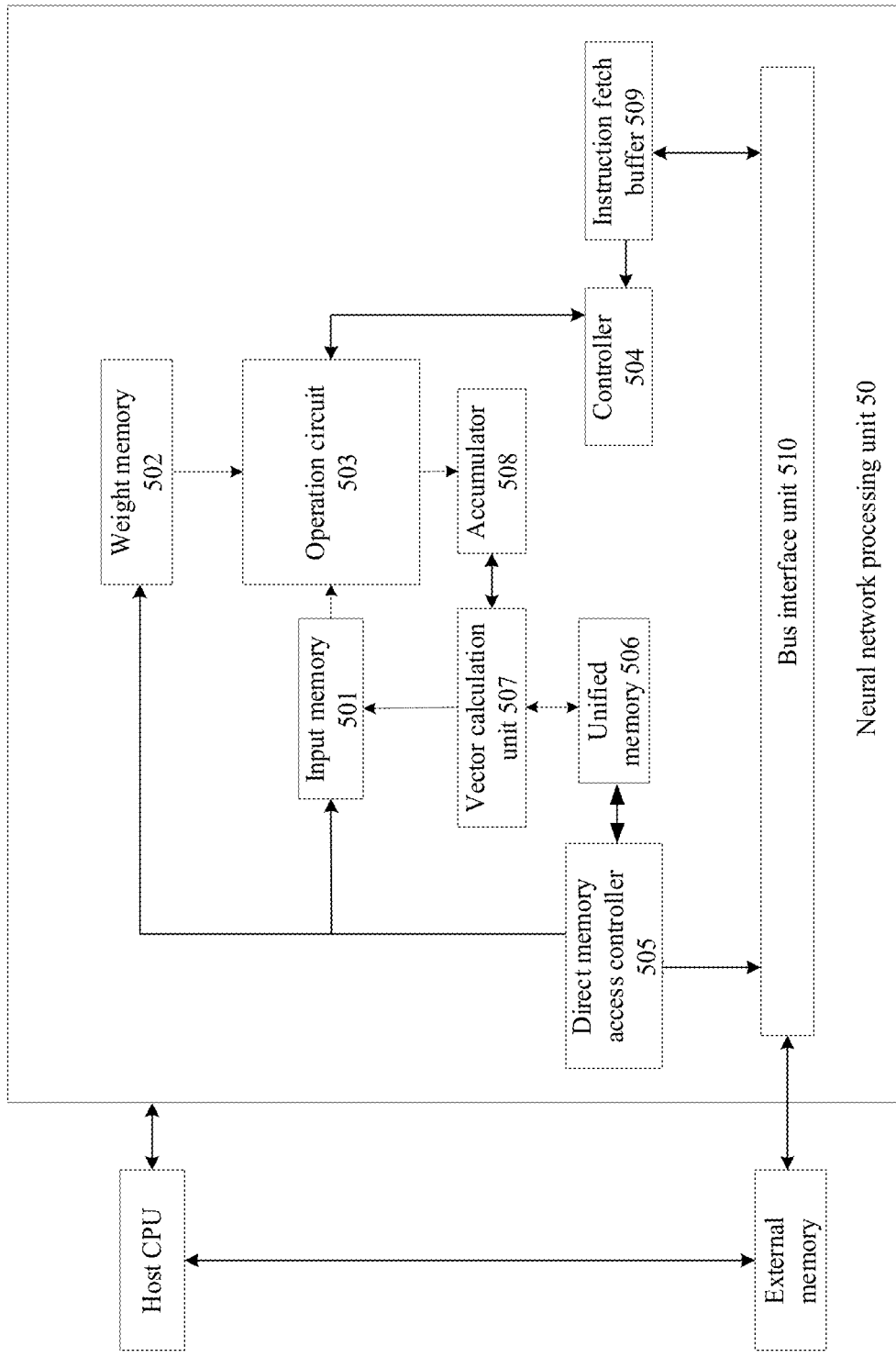
FIG. 2C is a schematic diagram of a structure of a neural network processing unit according to an embodiment of this disclosure.

FIG. 2C is a schematic diagram of a structure of a neural network processing unit according to an embodiment of the present disclosure.

The NPU 50, as a coprocessor, is mounted to a host CPU, and the host CPU allocates a task. A core part of the NPU is an operation circuit 503, and a controller 504 controls the operation circuit 503 to extract data in a memory (a weight memory or an input memory) and perform an operation.

In some implementations, the operation circuit 503 includes a plurality of processing units inside. In some implementations, the operation circuit 503 is a two-dimensional systolic array. The operation circuit 503 may alternatively be a one-dimensional systolic array or another electronic circuit capable of performing mathematical operations such as multiplication and addition. In some implementations, the operation circuit 503 is a general-purpose matrix processor.

For example, it is assumed that there are an input matrix A, a weight matrix B, and an output matrix C. The operation circuit extracts, from the weight memory 502, data corresponding to the matrix B, and buffers the data on each PE in the operation circuit. The operation circuit extracts data of the matrix A from the input memory 501, to perform a matrix operation on the data of the matrix B and the data of the matrix A, and a partial result or a final result of an obtained matrix is stored in an accumulator 508.

A vector calculation unit 507 may perform further processing on an output of the operation circuit, for example, vector multiplication, vector addition, exponential operation, logarithmic operation, and size comparison. For example, the vector calculation unit 507 may be configured to perform network calculation, such as pooling, batch normalization, or local response normalization, at a non-convolutional/non-fully connected (FC) layer in a neural network.

In some implementations, the vector calculation unit 507 can store a processed output vector in a unified memory 506. For example, the vector calculation unit 507 may apply a non-linear function to an output, for example, a vector of an accumulated value, of the operation circuit 503, to generate an activation value. In some implementations, the vector calculation unit 507 generates a normalized value, a combined value, or both a normalized value and a combined value. In some implementations, the processed output vector can be used as an activation input into the operation circuit 503, for example, used at a subsequent layer in the neural network.

The unified memory 506 is configured to store input data and output data.

A direct memory access controller (DMAC) 505 is configured to transfer input data in an external memory to the input memory 501 and/or the unified memory 506, stores weight data in the external memory in the weight memory 502, and stores data in the unified memory 506 in the external memory.

A bus interface unit (BIU) 510 is configured to implement interaction between the host CPU, the DMAC, and an instruction fetch buffer 509 through a bus.

The instruction fetch buffer 509 connected to the controller 504 is configured to store instructions used by the controller 504.

The controller 504 is configured to invoke the instructions buffered in the instruction fetch buffer 509, so that controlling a working process of an operation accelerator is implemented.

Usually, the unified memory 506, the input memory 501, the weight memory 502, and the instruction fetch buffer 509 each are an on-chip memory. The external memory is a memory outside the NPU. The external memory may be a double data rate (DDR) synchronous dynamic random-access memory (RAM) (SDRAM), a High Bandwidth Memory (HBM), or another readable and writable memory.

Figure 3:
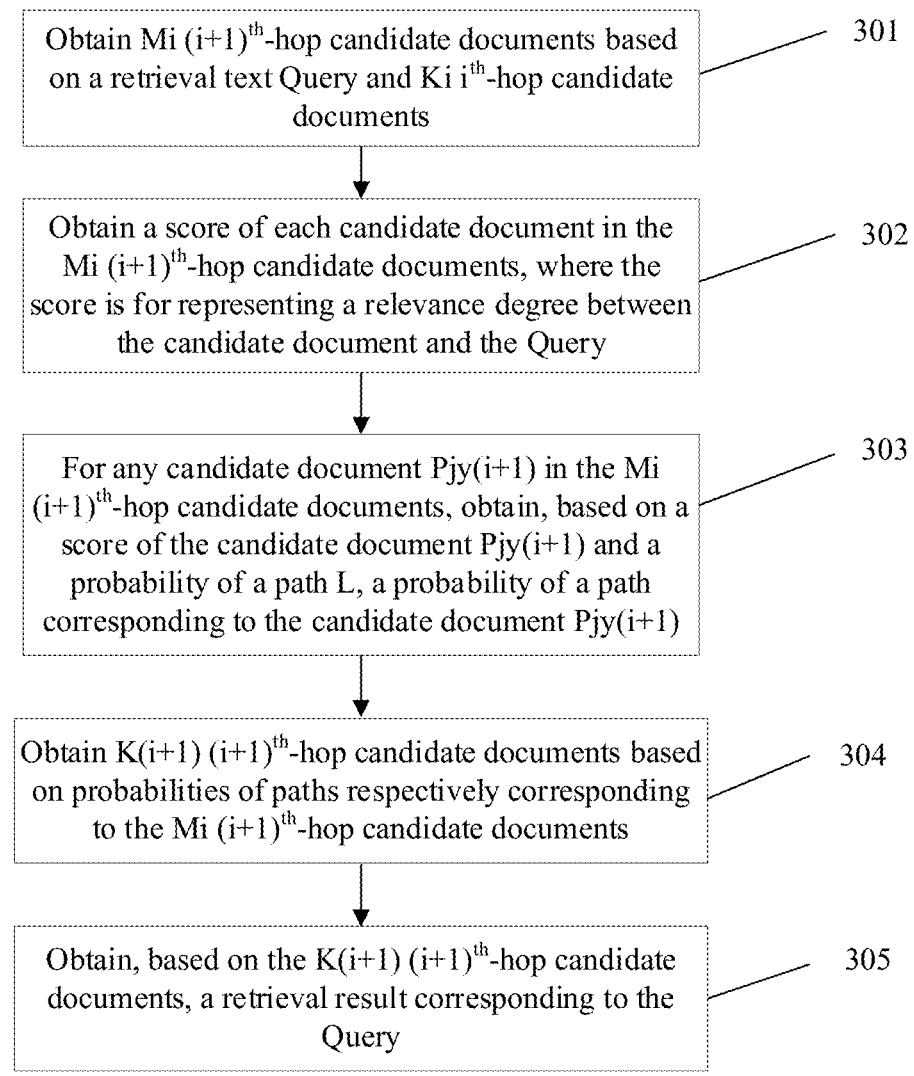
FIG. 3 is a schematic flowchart of an information retrieval method according to an embodiment of this disclosure.

The following describes in detail an information retrieval method provided in embodiments of this disclosure. FIG. 3 is a schematic flowchart of an information retrieval method according to an embodiment of this disclosure. As shown in FIG. 3, the method includes steps 301 to 305. The steps are as follows.

301: Obtain Mi $(i+1)^{th}$-hop candidate documents based on a retrieval text query and Ki $i^{th}$-hop candidate documents, where i, Ki, and Mi are all positive integers, and Ki is not greater than Mi.

The foregoing retrieval text query may be text content input by a user in a search box.

In an optional implementation, before step 301, the method further includes constructing a candidate document library.

The candidate document library includes a document whose granularity is a paragraph. In other words, any candidate document in the candidate document library includes a segment of content.

Optionally, a plurality of web pages or texts are collected, content in each web page or text is divided into paragraphs, a title is used as a tag of each paragraph, and indexes are established for all paragraphs to which tags are added, to obtain the candidate document library.

Optionally, the query and the K $i^{th}$-hop candidate documents are input into a retriever including a deep pre-trained language model, to obtain the Mi candidate documents.

In an optional implementation, the query is directly spliced with each candidate document in the K $i^{th}$-hop candidate documents, and then K texts obtained through splicing are retrieved by using the retriever, to obtain the Mi $(i+1)^{th}$-hop candidate documents.

Further, a representation vector is calculated for each preselected document in massive preselected documents by using the deep pre-trained language model, and each representation vector is stored and an index is created for each vector. Then, a representation vector of each query in different queries is obtained. Finally, a plurality of documents most related to the query is obtained in a manner of quick searching based on a vector index.

The foregoing descriptions are provided by using only an example in which the query is directly spliced with each candidate document in the K $i^{th}$-hop candidate documents. Another form may be alternatively used. This is not limited in this solution.

302: Obtain a score of each candidate document in the Mi $(i+1)^{th}$-hop candidate documents, where the score is for representing a relevance degree between the candidate document and the query.

Optionally, the retriever including the deep pre-training language model may score each candidate document based on the relevance degree between the candidate document and the query, to output the score of each candidate document in the Mi $(i+1)^{th}$-hop candidate documents.

In an optional implementation, an example in which a Google open-source deep pre-trained language model Bert is used as the deep pre-trained language model is used for description. The model Bert is obtained by stacking some basic network units, such as Transformer networks, into a huge network model, and using massive data for processing such as pre-training. An $i^{th}$ hop is used as an example. The query and an $r^{th}$ candidate document Pri obtained in the $i^{th}$ hop are input, and an output is a score, of the candidate document Pri, obtained by the model under a condition of inputting Q. Refer to the following formula (1):

$$\text{Score}(Pri|Q)=\text{Model}([Pri,Q]), \text{ where } ri=1,2,\ldots,Ni \quad (1)$$

303: For any candidate document Pjy(i+1) in the Mi $(i+1)^{th}$-hop candidate documents, obtain, based on a score of the candidate document Pjy(i+1) and a probability of a path L, a probability of a path corresponding to the candidate document Pjy(i+1). The path L is a path that starts with a first-hop candidate document and ends with a candidate document Pji in the Ki $i^{th}$-hop candidate documents. The candidate document Pji is a $j^{th}$ candidate document in the Ki $i^{th}$-hop candidate documents. The candidate document Pjy(i+1) is a $y^{th}$ candidate document, in the candidate documents, obtained based on the candidate document Pji.

It should be noted that the any candidate document Pjy(i+1) indicates that the candidate document is randomly selected. The any candidate document is obtained based on a previous-hop candidate document. j and y are merely used for ease of description, and do not have a specific limitation function.

Further, when i=1 (namely, a first hop), the query and an $r^{th}$ candidate document Pr1 obtained in the first hop are input, and an output is a score (Pr1|Q), of the candidate document Pr1, obtained by the model under a condition of inputting Q. Refer to the foregoing formula (1).

Based on M1 candidate documents obtained in the first hop, a score of each candidate document and a probability of a path corresponding to each candidate document are obtained.

The probability of the path is a probability of selecting the path. The path starts with the first-hop candidate document and ends with any $i^{th}$-hop candidate document, and indicates that a current-hop candidate document is obtained based on a candidate document corresponding to the foregoing path. The path may be for explaining the current-hop candidate document, to learn of a process of obtaining the candidate document.

For example, a path that starts with the first-hop candidate document and ends with any fourth-hop candidate document is used as an example for description. The path includes four hops, and correspondingly, the path includes four candidate documents. A second-hop candidate document corresponding to the path may be obtained based on the first-hop candidate document. A third-hop candidate document corresponding to the path may be obtained based on the second-hop candidate document. The fourth-hop candidate document corresponding to the path may be obtained based on the third-hop candidate document. Each path is unique.

When i=1, K candidate documents with high scores in the M1 candidate documents are obtained, and the scores of the K candidate documents are normalized into probabilities, so that K probabilities (conditional probabilities) of a first-hop retrieval path under the condition of inputting Q can be obtained.

Further, the scores of the K candidate documents may be normalized by using a Softmax function, to obtain the K probabilities.

Correspondingly, a probability of a path corresponding to any candidate document s1 in the K first-hop candidate documents may be represented as:

$$G(Ps1|Q) = \text{Softmax}(\text{TopK}(\text{Score}(Ps1|Q))),$$
$$\text{where } s1=1,2,\ldots,K \qquad (2)$$

The foregoing uses a probability of a first-hop path as an example for description. Correspondingly, a probability of a path corresponding to a second-hop candidate document Pst2 may be represented as:

$$G(Pst2,Ps1|Q) = G(Pst2|Q,Ps1)*G(Ps1|Q),$$
$$\text{where } st2=1,2,\ldots,N2 \qquad (3)$$

The second-hop candidate document Pst2 is obtained based on the first-hop candidate document Ps1.

By analogy, the probability of the path corresponding to the any candidate document $Pjy(i+1)$ in the $(i+1)^{th}$-hop candidate documents may be obtained.

304: Obtain $K(i+1)$ $(i+1)^{th}$-hop candidate documents based on probabilities of paths respectively corresponding to the Mi $(i+1)^{th}$-hop candidate documents. The $K(i+1)$ $(i+1)^{th}$-hop candidate documents are candidate documents in the Mi $(i+1)^{th}$-hop candidate documents, and probabilities of paths of the $K(i+1)$ $(i+1)^{th}$-hop candidate documents are all higher than a probability of a path of a remaining candidate document in the Mi candidate documents. $K(i+1)$ is a positive integer not greater than Mi.

Further, M2 second-hop candidate documents are generated based on K paths corresponding to the K first-hop candidate documents. A probability of a path corresponding to each second-hop candidate document is obtained based on a score of each second-hop candidate document and a probability of a previous-hop path corresponding to each candidate document. K paths with a high probability of a path are used as next-hop base paths to obtain a plurality of candidate documents, and so on, to obtain $K(i+1)^{th}$-hop documents with a high probability of a path.

In other words, probabilities of paths of the $K(i+1)^{th}$-hop candidate documents are higher than a probability of a path of a remaining candidate document in the Mi candidate documents.

It should be noted that in this embodiment of this disclosure, an example in which K paths are selected for each hop is used for description. Alternatively, a different quantity of paths may be selected for each hop. This is not limited in this solution.

A method for generating a next-hop candidate document may be using a hyperlinked document in a previous-hop document as the next-hop candidate document. For example, a web page hyperlinked document in the previous-hop document is used as the next-hop candidate document. A web page hyperlink is a hyperlink on an Internet web page. The hyperlink can be clicked to go to another web page or page paragraph. Certainly, the next-hop candidate document may alternatively be obtained in another form. This is not limited in this solution.

305: Obtain, based on the $K(i+1)$ $(i+1)^{th}$-hop candidate documents, a retrieval result corresponding to the query.

Optionally, step 305 may include the following steps.

3051: Determine whether the $K(i+1)$ $(i+1)^{th}$-hop candidate documents satisfy a first preset stop condition.

3052: If the $K(i+1)$ $(i+1)^{th}$-hop candidate documents satisfy the first preset stop condition, obtain, based on the $K(i+1)$ $(i+1)^{th}$-hop candidate documents, the retrieval result corresponding to the query.

The first preset stop condition may be used to determine whether there is a stop character in at least one candidate document in the K candidate documents. If there is a stop character in at least one candidate document in the K candidate documents, the retrieval result corresponding to the query is returned. If there is no stop character, i=i+1 is set, and steps 301 to 304 are repeatedly performed. For example, the query input by the user is merged with the K candidate documents obtained above, and a merged text is used as a new input into the retriever, to perform a new round of retrieval and obtain a next-hop candidate document. In this solution, retrievers used for retrieval in each hop may alternatively be different. This is not limited in this solution.

It should be noted that the stop character may be any document with a special tag, so that the model can automatically stop iterative retrieval.

The foregoing step 305 may include the following two implementation forms.

In an optional implementation, a path corresponding to each candidate document in the $K(i+1)^{th}$-hop candidate documents is obtained. The path corresponding to each candidate document is a path that starts with the first-hop candidate document and ends with the $(i+1)^{th}$-hop candidate document. The path corresponding to each candidate document is used as the retrieval result corresponding to the query.

Compared with a conventional technology in which a document set is finally output, in this solution, an entire path is output, so that a retrieval result is interpretable.

In other words, K texts are output based on the query input by the user. Each text includes $(i+1)^{th}$-hop candidate documents and candidate documents corresponding to the candidate document in first i hops. Further, each text corresponds to (i+1) $(i+1)^{th}$-hop candidate documents, and a path corresponding to the i+1 candidate documents each start with the first-hop candidate document and end with the $(i+1)^{th}$-hop candidate document.

Further, sorting may be performed based on the probabilities of the paths corresponding to the $K(i+1)^{th}$-hop candidate documents, to output the sorted K texts.

In another optional implementation, each of the $K(i+1)^{th}$-hop candidate documents is used as the retrieval result corresponding to the query. The path corresponding to each candidate document is for explaining the retrieval result corresponding to the candidate document.

In other words, the retrieval result includes each candidate document in the $K(i+1)^{th}$-hop candidate documents, and the path corresponding to each candidate document is for explaining the retrieval result corresponding to the candidate document, to help the user learn of a process of obtaining the retrieval result.

This embodiment is described by using an example in which a retrieval result includes candidate documents in two hops and an $(i+1)^{th}$-hop candidate document. The retrieval result may alternatively include a candidate document in any other hop. This is not further limited in this solution.

In this embodiment of this disclosure, a probability of a path corresponding to each of Mi obtained current-hop candidate documents is obtained based on a score of the candidate document and a probability of a previous-hop path corresponding to the candidate document, so that next-hop candidate documents are obtained based on a plurality of candidate documents with a high probability, and a retrieval result is finally obtained. Compared with the conventional technology in which a plurality of candidate documents obtained in each hop are sorted and screened based on only a score of each candidate document, in this solution, global sorting may be performed on retrieval paths from a globally optimal perspective, to improve accuracy and efficiency of information retrieval.

Figures 4, 5:
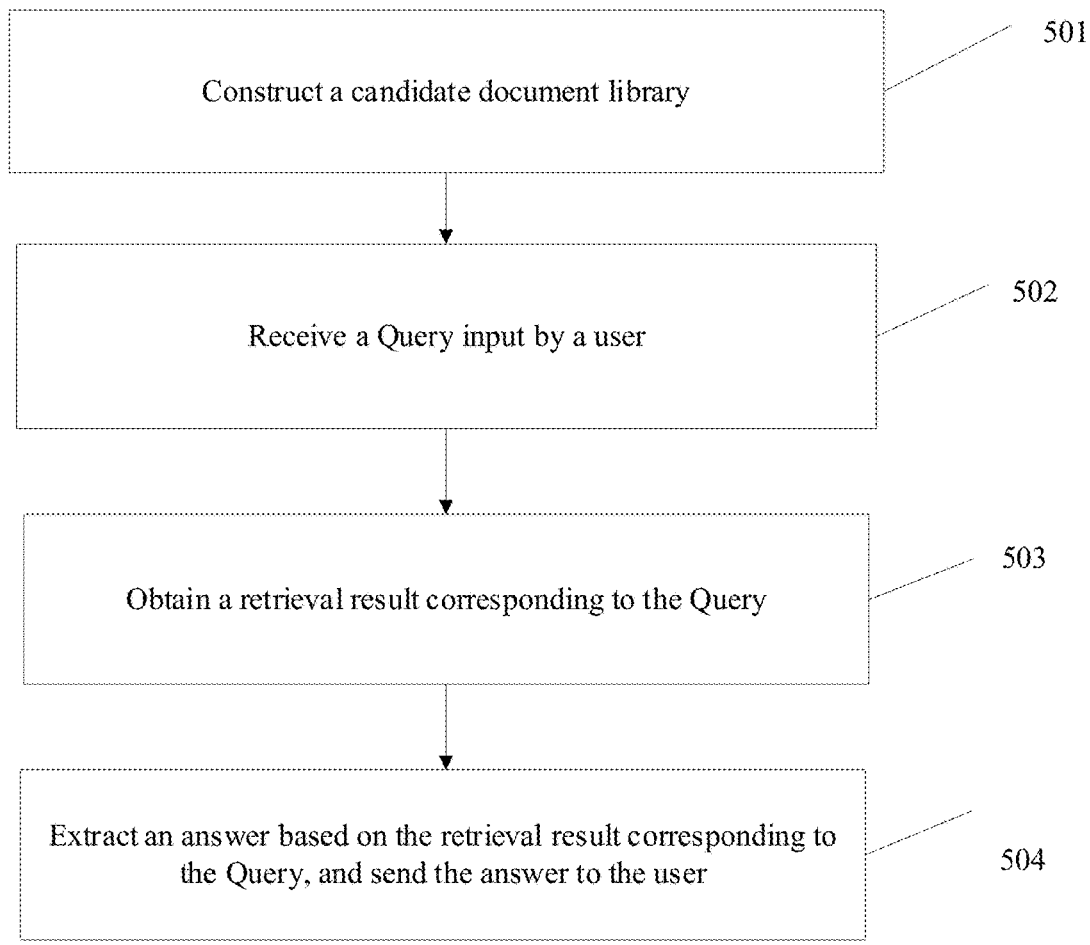
FIG. 4 is a schematic flowchart of a model training method according to an embodiment of this disclosure.
FIG. 5 is a schematic flowchart of an information retrieval method according to an embodiment of this disclosure.

In an optional implementation, in the embodiment shown in FIG. 3, the query may be input into a first neural network for processing, to obtain the retrieval result corresponding to the query. The first neural network may be obtained through training in a model training method shown in FIG. 4. The following describes in detail a model training method provided in embodiments of this disclosure. FIG. 4 is a schematic flowchart of a model training method according to an embodiment of this disclosure. The method includes steps 401 and 402. The steps are further as follows.

401: Obtain a training sample. The training sample includes a retrieval text query and a positive sample. The positive sample includes a path corresponding to an $(N+1)^{th}$-hop first document sample. The path corresponding to the $(N+1)^{th}$-hop first document sample is a path that starts with a first-hop document sample and ends with the $(N+1)^{th}$-hop first document sample. The $(N+1)^{th}$-hop first document sample is a document sample corresponding to a path whose probability is higher than probabilities of paths of remaining $K(N+1)-1$ paths in $K(N+1)$ $(N+1)^{th}$-hop document samples. A probability of a path corresponding to any document sample $Pjy(N+1)$ in the $K(N+1)$ $(N+1)^{th}$-hop document samples is obtained based on a score of the document sample $Pjy(N+1)$ and a probability of a path T. The score is for representing a relevance degree between the document sample and the query, and the path T is a path that starts with the first-hop document sample and ends with a document sample PjN in the $K(N+1)$ $(N+1)^{th}$-hop document samples. The document sample PjN is a $j^{th}$ document sample in KN $N^{th}$-hop document samples. The document sample $Pjy(N+1)$ is a $y^{th}$ document sample, in the document samples, obtained based on the document sample PjN. The training sample further includes $K1-1$ first-hop negative samples. The $K1-1$ first-hop negative samples are document samples, in K1 current-hop document samples, other than a current-hop document sample corresponding to the positive sample. N is a positive integer, both K1 and $K(N+1)$ are integers not less than 2, and both j and y are positive integers.

It should be noted that, quantities of document samples in different hops may be the same or may be different. This is not further limited in this solution.

The following uses an example in which a quantity of document samples in each hop is K for description.

Further, the training sample includes the query, the path corresponding to the $(N+1)^{th}$-hop first document sample, and $K-1$ first-hop negative samples. Correspondingly, it may be understood that the positive sample may include a positive document sample corresponding to each of $N+1$ hops. The positive document sample in each hop is obtained based on a previous-hop positive document sample.

$N+1$ is a quantity of hops or rounds corresponding to a retrieval result corresponding to the query. In other words, the final retrieval result is obtained through $N+1$ rounds of retrieval.

402: Train a first neural network based on the training sample, to obtain a trained first neural network.

Step 402 may further include: S1: obtaining Mi $i^{th}$-hop candidate samples based on the query, an $i^{th}$-hop document sample corresponding to the positive sample, $Ki-1$ $i^{th}$-hop negative samples, and $Ki-1$ $i^{th}$-hop negative samples of paths, where any one of the $i^{th}$-hop negative samples of the paths includes a path that starts with any one of K1 first-hop document samples and ends with any one of the $Ki-1$ $i^{th}$-hop negative samples, where i is an integer not less than 1, Ki is an integer not less than 2, and Mi is a positive integer, S2: obtaining a score of each candidate sample in the Mi $i^{th}$-hop candidate samples, S3: obtaining, based on the score of each candidate sample in the Mi $i^{th}$-hop candidate samples, a probability of a path corresponding to each candidate sample, S4: obtaining $K(i+1)$ $(i+1)^{th}$-hop document samples based on probabilities of paths respectively corresponding to the Mi $i^{th}$-hop candidate samples, where probabilities of paths of the $K(i+1)$ $(i+1)^{th}$-hop document samples are all higher than a probability of a path of a remaining candidate sample in the Mi candidate samples, $K(i+1)$ is a positive integer not greater than Mi, and the $K(i+1)$ $(i+1)^{th}$-hop document samples include an $(i+1)^{th}$-hop document sample corresponding to the positive sample and $K(i+1)-1$ $(i+1)^{th}$-hop negative samples, and S5: adjusting a parameter of the first neural network based on the paths respectively corresponding to the $K(i+1)$ $(i+1)^{th}$-hop document samples and the positive sample, to obtain the trained first neural network, where when i=1, no first-hop negative sample of a path exists.

Step S5 may include, when the $K(i+1)$ $(i+1)^{th}$-hop document samples satisfy a second preset stop condition, a parameter of the first neural network is adjusted based on the paths respectively corresponding to the $K(i+1)^{th}$-hop document samples and the positive sample, to obtain the trained first neural network.

If the $K(i+1)$ $(i+1)^{th}$-hop document samples do not satisfy the second preset stop condition, i=i+1 is set, and steps S1 to S4 are repeatedly performed until the second preset stop condition is satisfied.

The second preset condition may be that there is a stop character in at least one candidate sample in the $K(i+1)$ $(i+1)^{th}$-hop document samples. For related descriptions of the stop character, refer to the foregoing embodiments. Details are not described herein again.

When i=1, no first-hop negative sample of a path exists, in other words, no negative sample of a path is input in the first hop during input.

For determining a score of a candidate sample, a probability of a path corresponding to a candidate sample, and the like in the foregoing training process, refer to related descriptions in the foregoing embodiments. Details are not described herein again.

It may be understood that K samples may be included in each hop, one of the K samples is a positive sample in the hop, and remaining K−1 samples are a negative sample in the hop. K may be any specified value.

To be specific, in the training process, for retrieval in each hop, a correct candidate document in a current hop and a fixed quantity of error candidate documents are applied. Further, a depth pre-trained language model corresponding to each hop may be trained based on a positive and negative sample pair included in each hop. The fixed quantity of error candidate documents are the K−1 negative samples in each hop. The negative sample is dynamically generated based on a previous-hop sample. In addition, global modeling and scoring are performed on multi-round retrieval paths by using a probability, so that during training, all paths before a current round can be supervised by using a supervision signal in each hop, to improve retrieval precision of the model.

The any one of the $i^{th}$-hop negative samples of the paths includes a path that starts with any one of K first-hop document samples and ends with any one of K−1 $i^{th}$-hop negative samples.

In other words, during the training process, a correct path in a current hop and an error path in the current hop are applied to K paths expressed by using a probability of a path in each hop. For example, a positive sample corresponding to a first hop is $Pagei^+$, and negative samples are $Pagei^{1-}$, $Pagei^{2-}$, ..., $Pagei^K$. A positive sample corresponding to a second hop is $Pagej^+$, and negative samples are $Pagej^{1-}$, $Pagej^{2-}$, ..., $Pagej^K$. A second-hop positive sample of a retrieval path is $(Pagei^+, Pagej^+)$, and second-hop negative samples of paths are $(Pagei^+, Pagej^{1-})$, $(Pagei^+, Pagej^{2-})$, ..., $(Pagei^{1-}, Pagej^-)$, $(Pagei^{2-}, Pagej^-)$, and the like. Further, a deep pre-trained language model corresponding to each hop may be supervised based on a positive path and a negative path formed by each hop. Correspondingly, third-hop negative samples of paths include a sample that starts with a first-hop sample and ends with a third-hop sample other than a third-hop document sample corresponding to a positive sample, that is, ends with a third-hop negative sample. During training, a path supervision signal is applied when the first K candidate documents are dynamically selected in the model, so that a path arrived in a current round is continuously supervised. In addition, the path supervision signal is used together with a local supervision signal to greatly improve model precision, and the K candidate documents continuously change with the supervised signal. This enhances robustness of the model.

In this embodiment of this disclosure, the negative sample in the input training samples is obtained based on the K samples with a high probability. Compared with a conventional technology in which training is performed based on a randomly selected negative sample, this solution can improve model precision.

In this solution, a next-hop negative sample is determined based on the first K candidate documents with a high probability of a path. Compared with the conventional technology in which a negative sample in each hop is randomly determined, in this manner, a next-hop negative sample is dynamically determined based on the first K candidate documents with a high probability of a path in each hop. This implements dynamic adaptive candidate selection in each round and enhances robustness. In addition, in the training process of this solution, after a path supervision signal is introduced, K candidate documents selected in each hop may dynamically change with adjustment of a model by the supervision signal. This gradually increases difficulty of a negative sample, enhances a generalization capability of model sorting, and improves model precision.

FIG. 5 is a schematic flowchart of an information retrieval method according to an embodiment of this disclosure. The method is applied to a question and answer scenario. The method includes steps 501 to 504. The steps are further as follows.

501: Construct a candidate document library.

A Wiki web page is used as a data source, and is divided by using a paragraph as a granularity. A title is used as a tag of each paragraph. The candidate document library is constructed by creating an index. Optionally, there is a hyperlink of another web page in the foregoing paragraph, as shown in FIG. 6.

502: Receive a query input by a user.

Optionally, a question and answer system receives the query input by the user. The query is, for example, "where did Algeria qualify for the first time into the round of 16?"

503: Obtain a retrieval result corresponding to the query.

Further, first-hop retrieval is first performed on the query, to obtain M1 candidate documents and a score of each candidate document. In this embodiment, Bert is selected as a deep pre-trained language model. Bert1 represents a model used during the first-hop retrieval, and a correct document is "Wiki: Algeria at the FIFA World Cup".

The scores of all the first-hop candidate documents are sorted in descending order, and K candidate documents with a higher score are selected. The K scores are normalized into a probability by using a Softmax function. An example is used in which K is 4 for description in this embodiment of this disclosure. As shown in FIG. 7, hyperlinks of Top4 first-hop retrieval results (Z1, Z2, Z3, and Z4) are used at the same time, to form candidate documents for second-hop retrieval. For example, "Wiki: 2014 FIFA World Cup" is a document linked to by a hyperlink in the "Wiki: Algeria at the FIFA World Cup" paragraph, for example, document content corresponding to Mz in FIG. 7.

It is determined whether there is a stop character in the first-hop candidate documents. If there is no stop character, a score of a Z-Mz path is calculated by using a second-hop deep pre-trained language model. For example, the query, a first-hop retrieval document Zi, and a second-hop retrieval document Mzij are spliced and input into the Bert for scoring, and an obtained result is bij.

Scores of candidate documents calculated in a second hop are normalized to bzpij by using the Softmax function, and a probability api*bzpij of a path formed based on first-hop and second-hop retrieval is calculated, as shown in FIG. 7.

The first Top4 paths are selected based on the probability api*bzpij of the path formed based on the first-hop and second-hop retrieval, a next-hop probability is calculated and a path is screened, until the stop character appears in retrieved candidate documents, and each retrieval path and a corresponding probability are returned.

504: Extract an answer based on the retrieval result corresponding to the query, and send the answer to the user.

Documents in a found path are spliced and input into an answer extraction model for answer extracting. For example, if the found path is "Wiki: Algeria at the FIFA World Cup→Wiki: 2014 FIFA World Cup", and a later Wiki document contains "Brazil", the answer can be extracted in a machine reading comprehension manner and returned to the user.

Optionally, the foregoing implementation method is obtained by inputting the query into a first neural network for processing.

The first neural network is obtained through training based on the following training method.

Figure 8:
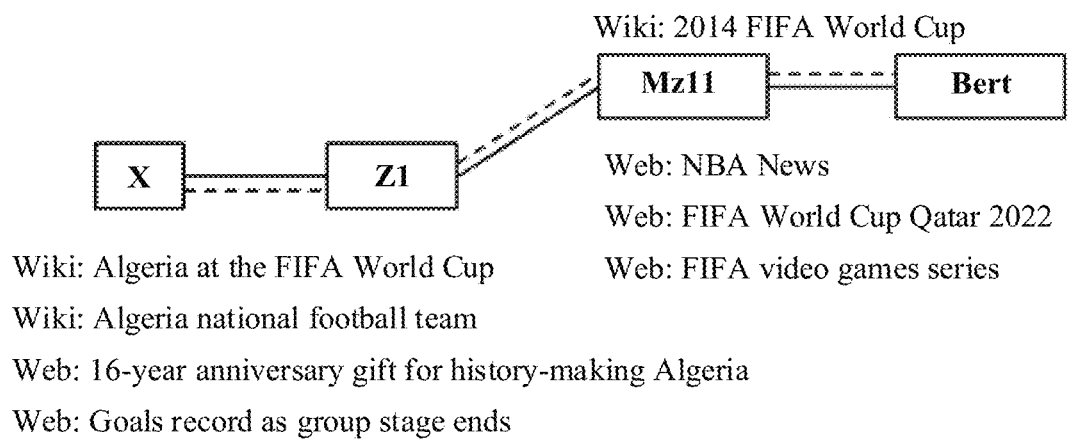
FIG. 8 is a schematic diagram of a sample according to an embodiment of this disclosure.

During training, a correct document supervision signal in a current round is applied to a deep pre-trained language model corresponding to each round. As shown in FIG. 8, when a deep pre-trained language model is trained in the first round, the model is notified that "Wiki: Algeria at the FIFA World Cup" is a positive sample, and a fixed negative sample is selected for "Wiki: Algeria at the FIFA World Cup". This is the same for the second round of retrieval.

Figure 9:
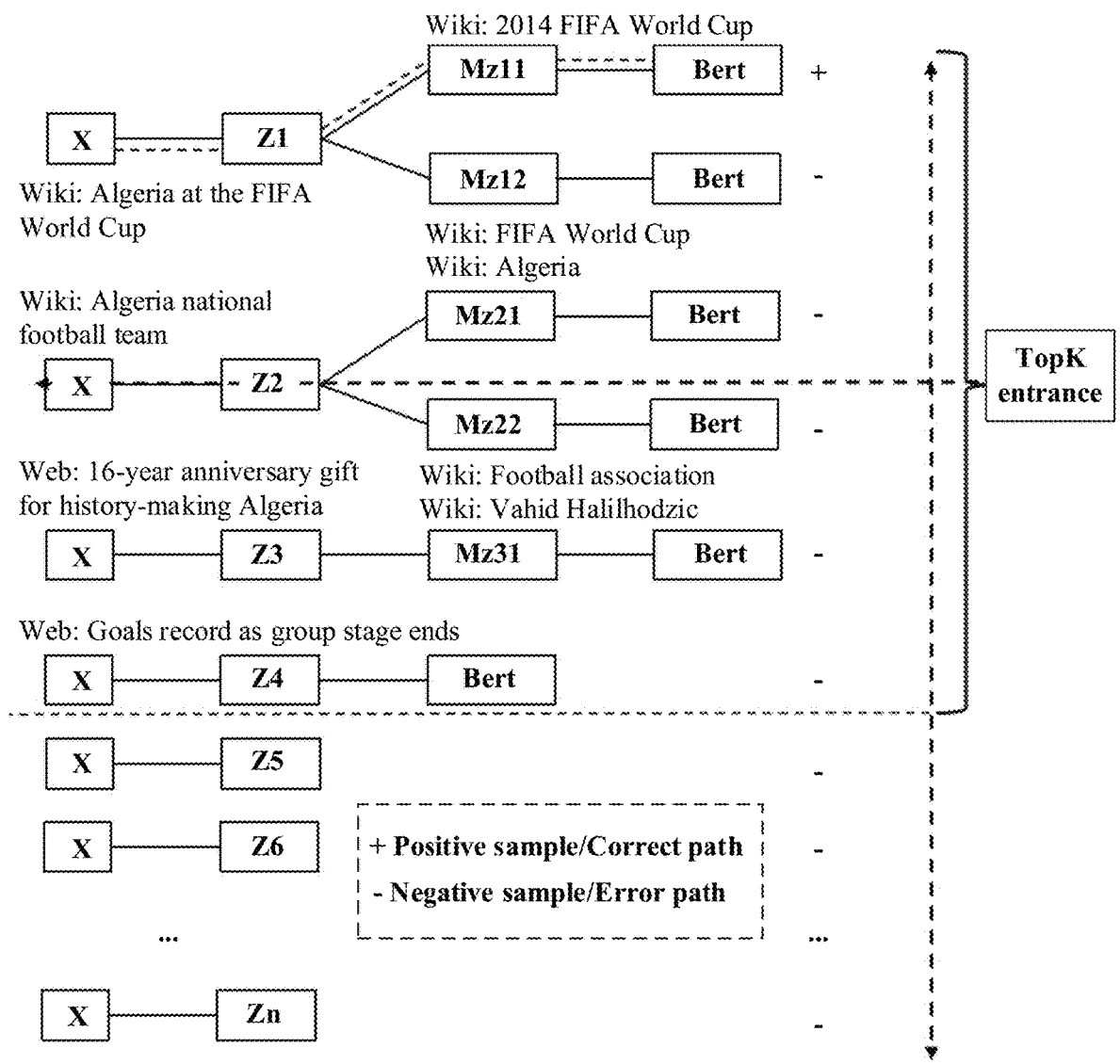
FIG. 9 is a schematic diagram of another sample according to an embodiment of this disclosure.

In addition, in a training process, for a score that is of K retrieval paths and that is expressed by using a probability in each round, a correct candidate path in a current round and an error candidate path that is in candidate documents in the current round and that corresponds to a retrieval result in a previous round are applied, as shown in FIG. 9. After an Mz series is retrieved in the second round, both correct and error path supervision signals are applied to deep pre-trained language models in the first and second rounds. The correct signal is "Wiki: Algeria at the FIFA World Cup→Wiki: 2014 FIFA World Cup", and the error signal in the second round is generated by candidate Top4 in the first round.

Figure 10:
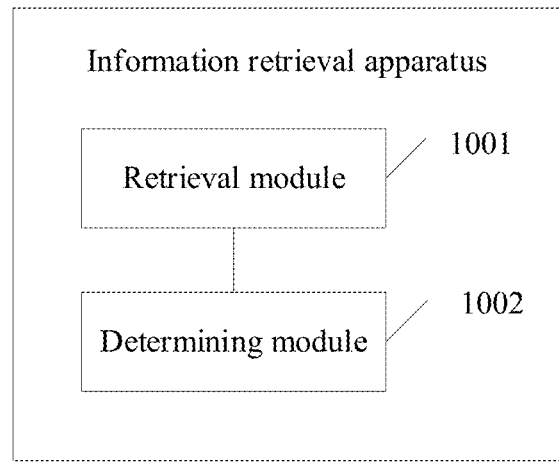
FIG. 10 is a schematic diagram of a structure of an information retrieval apparatus according to an embodiment of this disclosure.

FIG. 10 is a schematic diagram of a structure of an information retrieval apparatus according to an embodiment of this disclosure. As shown in FIG. 10, the apparatus includes a retrieval module 1001 and a determining module 1002, which are further as follows: a retrieval module 1001 configured to: S1: obtain Mi $(i+1)^{th}$-hop candidate documents based on a retrieval text query and Ki $i^{th}$-hop candidate documents, where i, Ki, and Mi are all positive integers, and Ki is not greater than Mi, S2: obtain a score of each candidate document in the Mi $(i+1)^{th}$-hop candidate documents, where the score is for representing a relevance degree between the candidate document and the query, S3: for any candidate document Pjy(i+1) in the Mi $(i+1)^{th}$-hop candidate documents, obtain, based on a score of the candidate document Pjy(i+1) and a probability of a path L, a probability of a path corresponding to the candidate document Pjy(i+1), where the path L is a path that starts with a first-hop candidate document and ends with a candidate document Pji in the Ki $i^{th}$-hop candidate documents, the candidate document Pji is a $j^{th}$ candidate document in the Ki $i^{th}$-hop candidate documents, the candidate document Pjy(i+1) is a $y^{th}$ candidate document, in the $(i+1)^{th}$-hop candidate documents, obtained based on the $i^{th}$-hop candidate document Pji, and both j and y are positive integers, and S4: obtain K(i+1) $(i+1)^{th}$-hop candidate documents based on probabilities of paths respectively corresponding to the Mi $(i+1)^{th}$-hop candidate documents, where the K(i+1) $(i+1)^{th}$-hop candidate documents are candidate documents in the Mi $(i+1)^{th}$-hop candidate documents, probabilities of paths of the K(i+1) $(i+1)^{th}$-hop candidate documents are all higher than a probability of a path of a remaining candidate document in the Mi candidate documents, and K(i+1) is a positive integer not greater than Mi, and a determining module 1002 configured to S5: obtain, based on the K(i+1) $(i+1)^{th}$-hop candidate documents, a retrieval result corresponding to the query.

The determining module 1002 is configured to, when the K(i+1) $(i+1)^{th}$-hop candidate documents satisfy a first preset stop condition, obtain, based on the K(i+1) $(i+1)^{th}$-hop candidate documents, the retrieval result corresponding to the query.

The determining module 1002 is further configured to obtain a path corresponding to each candidate document in the K(i+1) $(i+1)^{th}$-hop candidate documents. The path corresponding to each candidate document is a path that starts with the first-hop candidate document and ends with the $(i+1)^{th}$-hop candidate document. The path corresponding to each candidate document is used as the retrieval result corresponding to the query, or each candidate document is used as the retrieval result corresponding to the query. The path corresponding to each candidate document is for explaining the retrieval result corresponding to the candidate document.

Optionally, the determining module 1002 is further configured to, if the K(i+1) $(i+1)^{th}$-hop candidate documents do not satisfy the first preset stop condition, set i=i+1, and repeatedly perform steps S1 to S4 until the first preset stop condition is satisfied.

Optionally, the first preset stop condition is that there is a stop character in at least one candidate document in the K(i+1) $(i+1)^{th}$-hop candidate documents.

An embodiment of this disclosure provides a model training apparatus, including an obtaining module configured to obtain a training sample, where the training sample includes a retrieval text query and a positive sample, the positive sample includes a path corresponding to an $(N+1)^{th}$-hop first document sample, the path corresponding to the $(N+1)^{th}$-hop first document sample is a path that starts with a first-hop document sample and ends with the $(N+1)^{th}$-hop first document sample, the $(N+1)^{th}$-hop first document sample is a document sample corresponding to a path whose probability is higher than probabilities of paths of remaining K(N+1)−1 paths in K(N+1) $(N+1)^{th}$-hop document samples, a probability of a path corresponding to any document sample Pjy(N+1) in the K(N+1) $(N+1)^{th}$-hop document samples is obtained based on a score of the document sample Pjy(N+1) and a probability of a path T, the score is for representing a relevance degree between the document sample and the query, the path T is a path that starts with the first-hop document sample and ends with a document sample PjN in the K(N+1) $(N+1)^{th}$-hop document samples, the document sample PjN is a $j^{th}$ document sample in KN $N^{th}$-hop document samples, and the document sample Pjy(N+1) is a $y^{th}$ document sample, in the document samples, obtained based on the document sample PjN, the training sample further includes K1−1 first-hop negative samples, and the K1−1 first-hop negative samples are document samples, in K1 current-hop document samples, other than a current-hop document sample corresponding to the positive sample, where N is a positive integer, both K1 and K(N+1) are integers not less than 2, and both j and y are positive integers, and a training module configured to train a first neural network based on the training sample, to obtain a trained first neural network.

In an optional implementation, the training module is configured to: S1: obtain Mi $i^{th}$-hop candidate samples based on the query, an $i^{th}$-hop document sample corresponding to the positive sample, Ki−1 $i^{th}$-hop negative samples, and Ki−1 $i^{th}$-hop negative samples of paths, where any one of the $i^{th}$-hop negative samples of the paths includes a path that starts with any one of K1 first-hop document samples and ends with any one of the Ki−1 $i^{th}$-hop negative samples, where i is an integer not less than 1, Ki is an integer not less than 2, and Mi is a positive integer, S2: obtain a score of each candidate sample in the Mi $i^{th}$-hop candidate samples, S3: obtain, based on the score of each candidate sample in the Mi $i^{th}$-hop candidate samples, a probability of a path corresponding to each candidate sample, S4: obtain K(i+1) $(i+1)^{th}$-hop document samples based on probabilities of paths respectively corresponding to the Mi $i^{th}$-hop candidate samples, where probabilities of paths of the K(i+1) $(i+1)^{th}$-hop document samples are all higher than a probability of a path of a remaining candidate sample in the Mi candidate samples, K(i+1) is a positive integer not greater than Mi, and the K(i+1) $(i+1)^{th}$-hop document samples include an $(i+1)^{th}$-hop document sample corresponding to the positive sample and K(i+1)−1 $(i+1)^{th}$-hop negative samples, and S5: adjust a parameter of the first neural network based on the paths respectively corresponding to the K(i+1) $(i+1)^{th}$-hop document samples and the positive sample, to obtain the trained first neural network, where when i=1, no first-hop negative sample of a path exists.

The training module is further configured to, when the K(i+1) $(i+1)^{th}$-hop document samples satisfy a second preset stop condition, adjust the parameter of the first neural network based on the paths respectively corresponding to the K(i+1) $(i+1)^{th}$-hop document samples and the positive sample.

The training module is further configured to, if the K(i+1) $(i+1)^{th}$-hop document samples do not satisfy the second preset stop condition, set i=i+1, and repeatedly perform steps S1 to S4 until the second preset stop condition is satisfied.

The second preset stop condition is that there is a stop character in at least one candidate sample in the K(i+1) $(i+1)^{th}$-hop document samples.

Figure 11:
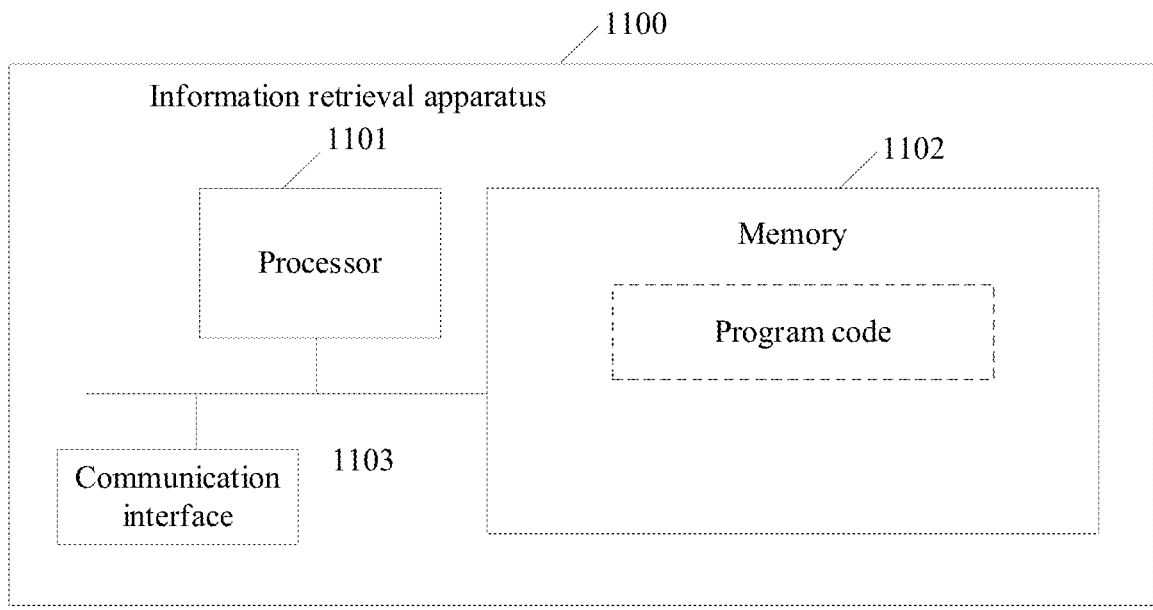
FIG. 11 is a schematic diagram of a structure of an information retrieval apparatus according to an embodiment of this disclosure.

FIG. 11 shows an information retrieval apparatus according to an embodiment of this disclosure. As shown in FIG. 11, the apparatus 1100 includes at least one processor 1101, at least one memory 1102, and at least one communication interface 1103. The processor 1101, the memory 1102, and the communication interface 1103 are connected to and communicate with each other through a communication bus.

The processor 1101 may be a general-purpose CPU, a microprocessor, an ASIC, or one or more integrated circuits for controlling program execution in the foregoing solution.

The communication interface 1103 is configured to communicate with another device or a communication network, such as an Ethernet, a radio access network (RAN), or a wireless local area network (WLAN).

The memory 1102 may be a read-only memory (ROM) or another type of static storage device capable of storing static information and instructions, a RAM or another type of dynamic storage device capable of storing information and instructions, or may be an electrically erasable programmable ROM (EEPROM), a compact disc (CD) ROM (CD-ROM) or another compact disc storage, an optical disc storage (including a CD, a laser disc, an optical disc, a DIGITAL VERSATILE DISC (DVD), a BLU-RAY disc, and the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through a bus. Alternatively, the memory may be integrated with the processor.

The memory 1102 is configured to store application program code for executing the foregoing solution, and the processor 1101 controls the execution. The processor 1101 is configured to execute the application program code stored in the memory 1102.

The code stored in the memory 1102 may perform any information retrieval method provided above.

An embodiment of this disclosure provides an information retrieval system, including a receiving module configured to receive a query input by a user, and a processing module configured to input the query into a first neural network, for processing, obtained through training by using the training method, to obtain a retrieval result corresponding to the query.

An embodiment of this disclosure further provides a chip system. The chip system is used in an electronic device. The chip system includes one or more interface circuits and one or more processors. The interface circuit and the processor are connected to each other through a line. The interface circuit is configured to receive a signal from a memory of the electronic device, and send the signal to the processor. The signal includes computer instructions stored in the memory. When the processor executes the computer instructions, the electronic device performs the methods.

An embodiment of this disclosure further provides a computer-readable storage medium. The computer-readable storage medium stores instructions. When the instructions are run on a computer or a processor, the computer or the processor is enabled to perform one or more steps in any one of the foregoing methods.

An embodiment of this disclosure further provides a computer program product including instructions. When the computer program product is run on a computer or a processor, the computer or the processor is enabled to perform one or more steps in any one of the foregoing methods.

All or some of the foregoing embodiments may be implemented by using software, hardware, firmware, or any combination thereof. When software is used to implement embodiments, all or a part of the embodiments may be implemented in a form of a computer program product. The computer program product includes one or more computer instructions. When the computer program instructions are loaded and executed on a computer, the procedures or functions according to embodiments of this disclosure are all or partially generated. The computer may be a general-purpose computer, a dedicated computer, a computer network, or another programmable apparatus. The instructions may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the procedures of the methods in embodiments may be implemented by a computer program instructing related hardware. The program may be stored in the computer-readable storage medium. When the program is executed, the procedures in the method embodiments may be included. The foregoing storage medium includes any medium that can store program code, such as a ROM, a RAM, a magnetic disk, or an optical disc.

The foregoing descriptions are merely specific implementations of embodiments of this disclosure, but are not intended to limit the protection scope of embodiments of this disclosure. Any variation or replacement within the technical scope disclosed in embodiments of this disclosure shall fall within the protection scope of embodiments of this disclosure. Therefore, the protection scope of embodiments of this disclosure shall be subject to the protection scope of the claims.

What is claimed is:

1. A method:
   S1: obtaining Mi $(i+1)^{th}$-hop candidate documents based on a retrieval text and Ki $i^{th}$-hop candidate documents, wherein i, Ki, and Mi are positive integers, and wherein Ki is less than or equal to Mi;
   S2: obtaining a first score for each of the Mi$(i+1)^{th}$-hop candidate documents, wherein the first score represents a relevance degree between a corresponding candidate document and the retrieval text query;
   S3: obtaining, for a candidate document Pjy(i+1) in the Mi $(i+1)^{th}$-hop candidate documents and based on the first score of the candidate document Pjy(i+1) and a first probability of a path L, a second probability of a first path corresponding to the candidate document Pjy(i+1), wherein the path L starts with a first-hop candidate document and ends with a candidate document Pji in the Ki $i^{th}$-hop candidate documents, wherein the candidate document Pji is a $j^{th}$ candidate document in the Ki $i^{th}$-hop candidate documents, wherein the candidate document Pjy(i+1) is a $y^{th}$ candidate document that is in the Mi (i+1)$^{th}$-hop candidate documents and that is based on the candidate document Pji, and wherein both j and y are positive integers;

S4: obtaining K(i+1) (i+1)$^{th}$-hop candidate documents based on third probabilities of second paths corresponding to the Mi(i+1)$^{th}$-hop candidate documents, wherein the K(i+1) (i+1)$^{th}$-hop candidate documents are in the Mi (i+1)$^{th}$-hop candidate documents, wherein the third probabilities of the second paths of the K(i+1) (i+1)$^{th}$-hop candidate documents are higher than the second probability of the first path of a remaining candidate document in the Mi (i+1)$^{th}$-hop candidate documents, and wherein K(i+1) is a positive integer less than or equal Mi; and S5: obtaining, based on the K(i+1) (i+1)$^{th}$-hop candidate documents, a retrieval result corresponding to the retrieval text query.

2. The method of claim 1, wherein obtaining the retrieval result comprises further obtaining, based on the K(i+1) (i+1)$^{th}$-hop candidate documents, the retrieval result when the K(i+1) (i+1)$^{th}$-hop candidate documents satisfy a preset stop condition.

3. The method of claim 2, wherein obtaining the retrieval result further comprises obtaining a third path corresponding to each of the K(i+1) (i+1)$^{th}$-hop candidate documents, wherein the third path starts with the first-hop candidate document and ends with an (i+1)$^{th}$-hop candidate document, and wherein the retrieval result is the third path.

4. The method of claim 2, further comprising:
identifying that the K(i+1) (i+1)$^{th}$-hop candidate documents do not satisfy the preset stop condition; and
in response to identifying that the K(i+1) (i+1)$^{th}$-hop candidate documents do not satisfy the preset stop condition:
setting i=i+1; and
repeatedly performing steps S1 to S4 until the first preset stop condition is satisfied.

5. The method of claim 2, wherein the preset stop condition indicates that a stop character is in at least one candidate document in the K(i+1) (i+1)$^{th}$-hop candidate documents.

6. The method of claim 2, wherein obtaining the retrieval result further comprises obtaining a third path corresponding to each of the K(i+1) (i+1)$^{th}$-hop candidate documents, wherein the third path starts with the first-hop candidate document and ends with an (i+1)$^{th}$-hop candidate document, wherein the retrieval result is each of the K(i+1) (i+1)$^{th}$-hop candidate documents, and wherein the third path explains the retrieval result.

7. The method of claim 1, wherein before obtaining the Mi (i+1)$^{th}$-hop candidate documents, the method further comprises constructing a candidate document library.

8. The method of claim 7, wherein the candidate document library comprises a document comprising granularity of a paragraph.

9. A computer program product comprising computer-executable instructions that are stored on a non-transitory computer-readable storage medium and that, when executed by at least one processor, cause an apparatus to:
S1: obtain Mi (i+1)$^{th}$-hop candidate documents based on a retrieval text query and Ki $i^{th}$-hop candidate documents, wherein i, Ki, and Mi are positive integers, and wherein Ki is less than or equal to Mi;
S2: obtain a first score of each of the Mi (i+1)$^{th}$-hop candidate documents, wherein the first score represents a relevance degree between a corresponding candidate document and the retrieval text query;
S3: obtain, for a candidate document Pjy(i+1) in the Mi (i+1)$^{th}$-hop candidate documents and based on the first score of the candidate document Pjy(i+1) and a first probability of a path L, a second probability of a first path corresponding to the candidate document Pjy(i+1), wherein the path L starts with a first-hop candidate document and ends with a candidate document Pji in the Ki $i^{th}$-hop candidate documents, wherein the candidate document Pji is a $j^{th}$ candidate document in the Ki $i^{th}$-hop candidate documents, wherein the candidate document Pjy(i+1) is a $y^{th}$ candidate document that is in the Mi (i+1)$^{th}$-hop candidate documents and that is based on the candidate document Pji, and wherein both j and y are positive integers;
S4: obtain K(i+1) (i+1)$^{th}$-hop candidate documents based on third probabilities of second paths corresponding to the Mi (i+1)$^{th}$-hop candidate documents, wherein the K(i+1) (i+1)$^{th}$-hop candidate documents are in the Mi (i+1)$^{th}$-hop candidate documents, wherein the third probabilities of the second paths of the K(i+1) (i+1)$^{th}$-hop candidate documents are higher than the second probability of the first path of a remaining candidate document in the Mi (i+1)$^{th}$-hop candidate documents, and wherein K(i+1) is a positive integer less than or equal to Mi; and
S5: obtain, based on the K(i+1) (i+1)$^{th}$-hop candidate documents, a retrieval result corresponding to the retrieval text query.

10. The computer program product of claim 9, wherein the computer-executable instructions further cause the apparatus to further obtain, based on the K(i+1) (i+1)$^{th}$-hop candidate documents, the retrieval result when the K(i+1) (i+1)$^{th}$ hop candidate documents satisfy a preset stop condition.

11. The computer program product of claim 10, wherein the computer-executable instructions further cause the apparatus to obtain a third path corresponding to each of the K(i+1) (i+1)$^{th}$-hop candidate documents, wherein the third path starts with the first-hop candidate document and ends with an (i+1)$^{th}$-hop candidate document and explains the retrieval result, and wherein the retrieval result is the third path.

12. The computer program product of claim 10, wherein the computer-executable instructions further cause the apparatus to:
identify that the K(i+1) (i+1)$^{th}$-hop candidate documents do not satisfy the preset stop condition; and
in response to identifying that the K(i+1) (i+1)$^{th}$-hop candidate documents do not satisfy the preset stop condition:
i=i+1; and
repeatedly perform steps S1 to S4 until the preset stop condition is satisfied.

13. The computer program product of claim 10, wherein the preset stop condition indicates that a stop character is in at least one candidate document in the K(i+1) (i+1)$^{th}$-hop candidate documents.

14. The computer program product of claim 10, wherein the computer-executable instructions further cause the apparatus to obtain a third path corresponding to each of the K(i+1) (i+1)$^{th}$-hop candidate documents, wherein the third path starts with the first-hop candidate document and ends with an (i+1)$^{th}$-hop candidate document, wherein the retrieval result is each of the K(i+1) $(i+1)^{th}$-hop candidate documents, and wherein the third path explains the retrieval result.

15. The computer program product of claim 9, wherein before obtaining the Mi $(i+1)^{th}$-hop candidate documents, the computer-executable instructions further cause the apparatus to construct a candidate document library.

\* \* \* \* \*